| (12) | United States Patent<br>Karczewicz | (10) Patent No.: US 9,319,700 B2<br>(45) Date of Patent: Apr. 19, 2016 |
|---|---|---|

(54) REFINEMENT COEFFICIENT CODING BASED ON HISTORY OF CORRESPONDING TRANSFORM COEFFICIENT VALUES

(75) Inventor: Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1312 days.

(21) Appl. No.: 11/868,009

(22) Filed: Oct. 5, 2007

(65) Prior Publication Data

US 2008/0089420 A1 Apr. 17, 2008

Related U.S. Application Data

(60) Provisional application No. 60/829,274, filed on Oct. 12, 2006, provisional application No. 60/883,741, filed on Jan. 5, 2007, provisional application No. 60/829,276, filed on Oct. 12, 2006.

(51) Int. Cl.
*H04N 11/02* (2006.01)
*H04N 19/34* (2014.01)
(Continued)

(52) U.S. Cl.
CPC ............. *H04N 19/34* (2014.11); *H04N 19/103* (2014.11); *H04N 19/13* (2014.11); *H04N 19/132* (2014.11);
(Continued)

(58) Field of Classification Search
CPC .................. H04N 19/00781; H04N 19/00442; H04N 19/00321; H04N 19/00545
USPC .......................... 375/240.12, 240.18, 240.23
See application file for complete search history.

(56) References Cited

U.S. PATENT DOCUMENTS

| 5,400,075 A | 3/1995 | Savatier |
|---|---|---|
| 5,640,420 A | 6/1997 | Jung |

(Continued)

FOREIGN PATENT DOCUMENTS

| JP | 6225279 A | 8/1994 |
|---|---|---|
| JP | 7274171 A | 10/1995 |

(Continued)

OTHER PUBLICATIONS

Macnicol, James et al., "Scalable Video Coding by Stream Morphing," IEEE Transactions on Circuits and Systems for Video Technology, vol. 15, No. 2, Feb. 2005, pp. 306-319.

(Continued)

*Primary Examiner* — Benjamin Lamont
(74) *Attorney, Agent, or Firm* — Brent Boyd

(57) ABSTRACT

This disclosure describes techniques for coding of refinement coefficients of an enhancement layer in a scalable video coding (SVC) scheme. According to this disclosure, a method may comprise evaluating a history of transform coefficient values associated with one or more previous layers of the SVC scheme, and estimating one or more refinement coefficient values associated with a current layer of the SVC scheme based on the history. On the encoding side, the coding process may include excluding information for one or more refinement coefficient values from the bitstream and signaling to the decoder that such information is excluded from the bitstream. On the decoding side, coding process include parsing the bitstream to identify information that signals to the decoder that information is excluded from the bitstream, and generating such information based on the history associated with one or more previous layers of the SVC scheme.

25 Claims, 10 Drawing Sheets

(51) Int. Cl.
*H04N 19/13* (2014.01)
*H04N 19/61* (2014.01)
*H04N 19/103* (2014.01)
*H04N 19/132* (2014.01)
*H04N 19/184* (2014.01)
*H04N 19/187* (2014.01)
*H04N 19/31* (2014.01)

(52) U.S. Cl.
CPC .......... *H04N 19/184* (2014.11); *H04N 19/187* (2014.11); *H04N 19/31* (2014.11); *H04N 19/61* (2014.11)

(56) References Cited

U.S. PATENT DOCUMENTS

| | | |
|---|---|---|
| 5,650,782 A | 7/1997 | Kim |
| 5,793,897 A | 8/1998 | Jo et al. |
| 5,835,145 A | 11/1998 | Ouyang et al. |
| 5,982,437 A | 11/1999 | Okazaki et al. |
| 6,069,575 A | 5/2000 | Kinouchi et al. |
| 6,144,322 A | 11/2000 | Sato |
| 6,275,531 B1 | 8/2001 | Li |
| 6,480,547 B1 * | 11/2002 | Chen et al. ............. 375/240.27 |
| 6,690,307 B2 | 2/2004 | Karczewicz |
| 6,700,933 B1 * | 3/2004 | Wu et al. ............. 375/240.16 |
| 6,731,811 B1 * | 5/2004 | Rose ............. 382/238 |
| 6,919,828 B2 | 7/2005 | Jeon et al. |
| 6,980,597 B1 | 12/2005 | Ling |
| 7,348,903 B2 | 3/2008 | Lee et al. |
| 7,369,706 B2 * | 5/2008 | Kurauchi ............. 382/239 |
| 7,664,176 B2 * | 2/2010 | Bao et al. ............. 375/240.08 |
| 7,912,510 B2 | 3/2011 | Park et al. |
| 2001/0033697 A1 | 10/2001 | Shimada |
| 2003/0009722 A1 | 1/2003 | Sugiyama et al. |
| 2003/0151529 A1 | 8/2003 | Karczewicz |
| 2004/0005096 A1 | 1/2004 | Kim et al. |
| 2004/0179606 A1 | 9/2004 | Zhou et al. |
| 2005/0025246 A1 | 2/2005 | Holcomb |
| 2005/0195896 A1 * | 9/2005 | Huang et al. ............. 375/240.03 |
| 2005/0201629 A1 * | 9/2005 | Karczewicz et al. ......... 382/240 |
| 2006/0078049 A1 | 4/2006 | Bao et al. |
| 2006/0153294 A1 | 7/2006 | Wang et al. |
| 2006/0233255 A1 * | 10/2006 | Ridge et al. ............. 375/240.18 |
| 2006/0273939 A1 | 12/2006 | Tanaka et al. |
| 2007/0080832 A1 | 4/2007 | Yang et al. |
| 2007/0160126 A1 * | 7/2007 | Van Der Meer et al. ...... 375/240 |
| 2007/0224973 A1 | 9/2007 | Park et al. |
| 2008/0089422 A1 | 4/2008 | Karczewicz |
| 2008/0089423 A1 | 4/2008 | Karczewicz |
| 2008/0089424 A1 | 4/2008 | Karczewicz et al. |
| 2009/0129467 A1 * | 5/2009 | Li et al. .................... 375/240.12 |

FOREIGN PATENT DOCUMENTS

| | | |
|---|---|---|
| JP | 8046521 A | 2/1996 |
| JP | 08280032 | 10/1996 |
| JP | 11242573 A | 9/1999 |
| JP | 11252573 A | 9/1999 |
| JP | 2001094982 | 4/2001 |
| JP | 2002058028 A | 2/2002 |
| JP | 2008507191 A | 3/2008 |
| JP | 2009506710 A | 2/2009 |
| KR | 20010105629 | 11/2001 |
| KR | 20030081772 | 10/2003 |
| KR | 100606588 | 8/2006 |
| KR | 20070062393 A | 6/2007 |
| KR | 1032277 | 4/2011 |
| RU | 2117388 | 8/1998 |
| RU | 2119727 | 9/1998 |
| RU | 2004125588 | 1/2006 |
| RU | 2005113308 | 1/2006 |
| RU | 2335845 | 10/2008 |
| TW | 200612755 | 4/2006 |
| TW | 200627963 | 8/2006 |
| WO | 9517073 A1 | 6/1995 |
| WO | WO03053066 A1 | 6/2003 |
| WO | WO20050094081 | 10/2005 |
| WO | WO2006067712 A1 | 6/2006 |
| WO | WO2006075235 A1 | 7/2006 |
| WO | 2006107281 A1 | 10/2006 |
| WO | 2008086197 | 7/2008 |

OTHER PUBLICATIONS

Gary J. Sullivan et al: Joint Video Team (JVT) of ISO/IEC MPEG & 14-22, ITU-T VCEG (ISO/IEC JTC1/SC29/VVG11 and 24,25 ITU-T SG16 Q .6).

International Search Report and Written Opinion—PCT/US2007/081129, International Search Authority—European Patent Office—Sep. 24, 2009.

Jian Zhou et al, FGS Enhancement Layer Truncation with Minimized Intra-Frame Quality Variation, Multimedia and Expo, 2003. Proceedings. 2003 International Conference on Jul.6-9, 2003, Piscataway, vol. 2, Jul. 6, 2003, pp. 361-364.

Nevdiaev L.M., Telecommunications Technology, English-Russian Explanatory Dictionary, Communications and Business, Moscow, 2002, pp. 103, 136.

Report of 78th meeting, International organization of standardization organization international de normalization ISO/IEC JTC 1/sc29/WG 11 coding of moving pictures and audio, p. 139.

Ridge J. et al., Improvement of FGS refinement, Joint Video Team (JVT) of ISO/IEC MPEG&ITU-T VCEG, JVT-V077, Jan. 13-19, 2007.

Shima M: "CE1: Complexity reduction for adaptive VLC", Geneva: ISO, CH. Jan. 10, 2006, XP030006289.

Xianglin Wang et al, CE7 Report, Multiple Fgs layer coding for low-delay applications, Joint Video Team (JVT) of ISO/IEC MPEG & ITU-T VCEG, JVT-R077, Jan. 14, 2006.

Yen-Kuang Chen et al, Implementation of Real-Time MPEG-4 FGS Encoder, Advances in Multimedia Information Processing—PCM 2002, Springer Berlin/Heidelberg, 2002, pp. 839-846.

Karczewicz, M., et al., "Improved Refinement Coefficients Coding," Joint Video Team (JVT) of ISO/IEC MPEG & ITU-T VCEG (ISO/IEC JTC1/SC29/WG11 and ITU-T SG16 Q.6), 21st Meeting: Hangzhou, China Oct. 20-27, 2006, No. JVT-U132, Oct. 20, 2006, XP030006778.

Ling, et al., "Bitplane Coding of DCT Coefficients for Image and Video Compression," Proceedings of the SPIE, SPIE, Bellingham, WA, vol. 3653, No. 1-2, 8, pp. 500-508.

Marpe, et al., "Improved CABAC for Progressive Refinement Slices," Joint Video Team (JVT) of ISO/IEC MPEG & ITU-T VCEG (ISO/IEC JTC1/SC29/WG11 and ITU-T SG16 Q.6, 20th Meeting: Klagenfurt, Austria, Jul. 15-21, 2006, No. JVT-T077.

Ridge, J., et al., "CE8: VLCs for SVC," Joint Video Team (JVT) of ISO/IEC MPEG & ITU-T VCEG (ISO/IEC JTC1/SC29/WG11 and ITU-T SG16 Q.6,17th Meeting: Nice, France, Oct. 14-21, 2005 No. JVT-Q040-L, Oct. 14, 2005, XP030006203.

Ridge, J., et al,: "Variable Length Codes for SVC," Joint Video Team (JVT) of ISO/IEC MPEG & ITU-T VCEG (ISO/IEC JTC1/SC29/WG11 and ITU-T SG16 Q.6), 16th Meeting: Poznan, Poland, Jul. 24-29, 2005, No. JVT-P056, Jul. 24, 2005, XP030106095.

Shima, M. "Modified VLC for Refinement Pass," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S031, Mar. 31, 2006, XP030006410.

Wiegand, et al., "Joint Draft 6: Scalable Video Coding," JVT-S 201, Apr. 2006, Geneva.

Wiegand, et al., "Joint Draft 9 of SVC Amendment," JVT-V 201, Jan. 2007, Marrakech, Morocco.

Ye, Y., et al., "Improvements to FGS Layer Variable Length Coder," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S066, Mar. 31, 2006, XP030006445.

ITU-T Recommendation H.223, Multiplexing Protocol for Low Bit Rate Multimedia Communication, (Jul. 2001).

(56) References Cited

OTHER PUBLICATIONS

ITU-T Recommendation H.263 Video Coding for Low Bit Rate Communication (Jan. 2005).

ITU-T Recommendation H.264, Advanced Video Coding for Generic Audiovisual Services, Mar. 2005.

"Forward Link Only Air Interface Specification for Terrestrial Mobile Multimedia Multicast," TIA-1099, Aug. 2006.

Bae-Keun Lee and woo-Jin Han, "VLC for FGS layer in 8×8 transform", Joint Video Team (JVT) of ISO/IEC MPEG & ITU-T VCEG (ISO/IEC JTC1/SC29/WG11 and ITU-T SG16 Q.6) 17th Meeting: Nice, FR, Document: JVT-4057, ITU-T, Oct. 14, 2005.

Bae-Keun Lee, "CE1: Improvement CAVLC for SVC ",Joint Video Team (JVT) of ISO/IEC MPEG & ITU-T VCEG (ISO/IEC JTC1/SC29/WG11 and ITU-T SG16 Q.6) 17th Meeting: Nice, FR, Document: JVT-4301, ITU-T, Oct. 21, 2005.

Julien Reichel et al., "Draft of Joint Scalable Video Model JSVM-4 Annex G", Joint Video Team(JVT) of ISO/IEC MPEG & ITU-T VCEG (ISO/IEC JTC1/SC29/WG11 and ITU-T SG16 Q.6) 17th Meeting: Nice, France, Document: JVT-4201, Filename: JVT-Q202-AnnexG.doc, ITU-T, Nov. 18, 2005.

Taiwan Search Report—TW096138307—TIPO—Apr. 19, 2011.

Taiwan Search Report—TW097108236—TIPO—Jun. 5, 2011.

Karczewicz M., "Report of core experiment on improved refinement coefficients coding (CE1)", JVT-V095, Joint Video Team (JVT) of ISO/IEC MPEG & ITU-T VCEG, 22nd Meeting: Marrakech, Jan. 13-19, 2007, p. 1 para.3-p. 2 para.7.

Taiwan Search Report—TW096138308—TIPO—Sep. 7, 2011.

European Search Report—EP12005301—Search Authority—Munich—Feb. 5, 2013.

* cited by examiner

REFINEMENT COEFFICIENT CODING BASED ON HISTORY OF CORRESPONDING TRANSFORM COEFFICIENT VALUES

This application claims the benefit of the following U.S. Provisional Applications, the entire content each of which is incorporated herein by reference:

U.S. Provisional Application No. 60,829,274, filed Oct. 12, 2006,

U.S. Provisional Application No. 60,883,741, filed Jan. 5, 2007, and

U.S. Provisional Application No. 60/829,276, filed Oct. 12, 2006.

TECHNICAL FIELD

This disclosure relates to digital video coding and, more particularly, coding of transform coefficients in enhancement layers of a scalable video coding (SVC) scheme.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

In video coding, video compression often includes spatial prediction, motion estimation and motion compensation. Intra-coding relies on spatial prediction to reduce or remove spatial redundancy between video blocks within a given video frame. Inter-coding relies on temporal prediction to reduce or remove temporal redundancy between video blocks of successive video frames of a video sequence. For inter-coding, a video encoder performs motion estimation to track the movement of matching video blocks between two or more adjacent frames. Motion estimation generates motion vectors, which indicate the displacement of video blocks relative to corresponding prediction video blocks in one or more reference frames. Motion compensation uses the motion vectors to generate prediction video blocks from a reference frame. After motion compensation, a residual video block is formed by subtracting the prediction video block from the original video block to be coded.

The video encoder usually applies transform, quantization and transform coefficient coding processes to further reduce the bit rate associated with communication of the residual block. Coding of transform coefficients of residual blocks, for example, may involve variable length coding (VLC) or other coding processes to further compress residual coefficients produced by the transform and quantization operations. For example, a VLC table may be used to match different sets of coefficients to variable length codewords in a manner that promotes coding efficiency. Different VLC tables may be used for different video content. Alternatively, residual coefficients may be coded as patterns of coefficients, e.g., coded block patterns. In any case, a video decoder performs inverse operations to reconstruct the coefficients, and then inverse transforms the coefficients to reconstruct the video information. The video decoder can decode the video information based on the motion information and residual information associated with video blocks.

Some video coding makes use of scalable techniques. For example, scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. The base layer may be transmitted in a manner that is more reliable than the transmission of enhancement layers. Enhancement layers may add spatial resolution to frames of the base layer, or may add additional frames to increase the overall frame rate. In one example, the most reliable portions of a modulated signal may be used to transmit the base layer, while less reliable portions of the modulated signal may be used to transmit the enhancement layers. Enhancement layers may define different types of transform coefficients, referred to as significant coefficients and refinement coefficients.

SUMMARY

In general, this disclosure describes techniques for coding refinement coefficients of an enhancement layer in a scalable video coding (SVC) scheme. Refinement coefficients refer to coefficients of an enhancement layer for which the corresponding coefficients of a previous layer, i.e., either a base layer or a previous enhancement layer, in the SVC scheme had non-zero values. In contrast, significant coefficients refer to coefficients of an enhancement layer for which the corresponding coefficients of a previous layer in the SVC scheme had values of zero. The coding of refinement coefficients may be performed separately from the coding of significant coefficients, although the techniques of this disclosure can also apply if refinement coefficients are coded with significant coefficients. The term transform coefficient is used herein to refer to both refinement and significant coefficients.

According to the techniques of this disclosure, some of the refinement coefficient values may be excluded from a bitstream that is transmitted from an encoding device to a decoding device to convey video or multimedia content. The values for such refinement coefficients can be derived at the decoder based on a history associated with these refinement coefficients. In particular, for a given type of video block, the values of some of the refinement coefficients can be determined to have a high probability of being zero based on the history associated with these refinement coefficients, i.e., a history of corresponding transform coefficients of previous layers of the SVC scheme. In this case, values for these refinement coefficients may be excluded from the bitstream since the values can be derived at the decoder.

In one example, this disclosure provides a method of coding refinement coefficients of an enhancement layer in an SVC scheme, the method comprising evaluating a history of transform coefficient values associated with one or more previous layers of the SVC scheme, and estimating one or more refinement coefficient values associated with a current layer of the SVC scheme based on the history.

In another example, this disclosure provides a device that codes refinement coefficients of an enhancement layer in an SVC scheme, the device comprising a history module that evaluates a history of transform coefficient values associated with one or more previous layers of the SVC scheme, and a coding module that estimates one or more refinement coefficient values associated with a current layer of the SVC scheme based on the history.

In another example, this disclosure provides a device that codes refinement coefficients of an enhancement layer in an SVC scheme, the device comprising means for evaluating a history of transform coefficient values associated with one or more previous layers of the SVC scheme, and means for coding that estimates one or more refinement coefficient values associated with a current layer of the SVC scheme based on the history.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to code refinement coefficients of an enhancement layer in an SVC scheme, wherein the instructions cause the device to evaluate a history of transform coefficient values associated with one or more previous layers of the SVC scheme, and estimate one or more refinement coefficient values associated with a current layer of the SVC scheme based on the history.

In some cases, the computer-readable medium may form part of a computer program product, which may be sold to manufacturers and/or used in a video coding device. The computer program product may include the computer-readable medium, and in some cases, may also include packaging materials.

In another example, this disclosure may be directed to a circuit configured to code refinement coefficients of an enhancement layer in an SVC scheme, wherein the circuit is configured to evaluate a history of transform coefficient values associated with one or more previous layers of the SVC scheme, and estimate one or more refinement coefficient values associated with a current layer of the SVC scheme based on the history.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1A:
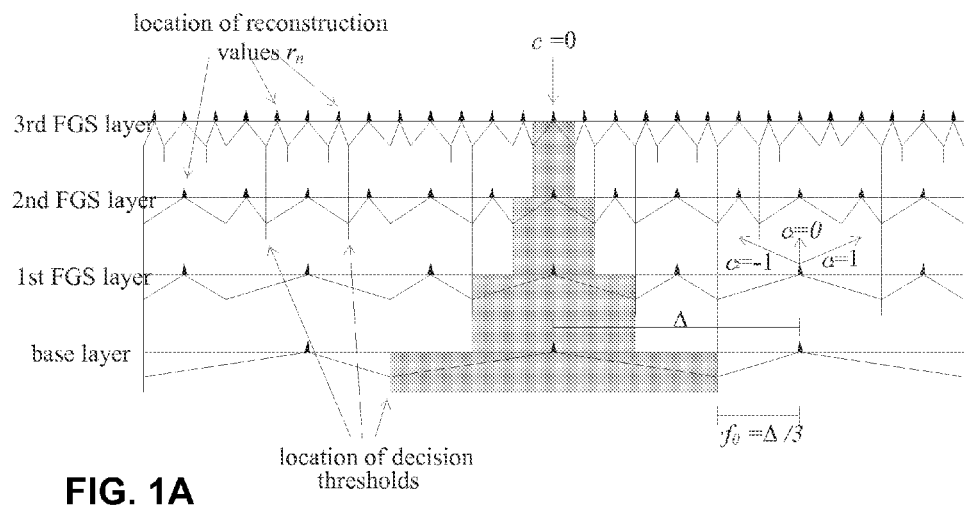
FIGS. 1A and 1B are mapping diagrams that illustrate possible values for a refinement coefficient based on a history of corresponding transform coefficients at different layers of a scalable video coding (SVC) scheme.

This disclosure describes techniques for coding refinement coefficients of enhancement layers in a scalable video coding (SVC) scheme. Refinement coefficients refer to transform coefficients of an enhancement layer for which the corresponding coefficients of a previous layer in the SVC scheme had non-zero values. In contrast, significant coefficients refer to transform coefficients of an enhancement layer for which the corresponding coefficients of a previous layer in the SVC scheme had values of zero. The term transform coefficient is used herein to refer to both refinement and significant coefficients, and generally refers to coefficients generated by a transformation process such as discrete cosign transformation (DCT). Coding of refinement coefficients may be performed separately from the coding of significant coefficients. The coding of refinement coefficients and significant coefficients typically involves a variable length coding (VLC) methodology in which different sets of coefficients are mapped to variable length codes in a VLC table.

According to the techniques of this disclosure, information indicative of some of the refinement coefficient values may be excluded from a bitstream that is transmitted from an encoding device to a decoding device to convey video or multimedia content. The values for such excluded refinement coefficients can be derived at the decoder based on a history associated with corresponding transform coefficients. In particular, for a given type of video block, the values of some of the refinement coefficients can be determined to have a high probability of being zero, based on the history associated with the corresponding transform coefficients. In this case, information indicative of the values for these refinement coefficients may be excluded from the bitstream since the values can be derived at the decoder. Refinement coefficients that can be determined to have a high probability of being zero based on the history are referred to herein as type-0 coefficients, while other refinement coefficients are referred to herein as type-1 coefficients.

The encoding device may encode a signal to instruct the decoding device to derive some of the refinement coefficients based on history. This signal may be as simple as a single-bit or multi-bit header for a frame or video block that instructs the decoding device to derive refinement coefficients, e.g., for a particular type of macroblock, such as for intra-coded blocks. The encoder and decoder may perform reciprocal coding methods (encoding and decoding) in which the history of transform coefficients is evaluated to determine whether refinement coefficient information can be excluded from the bitstream by the encoder and derived at the decoder. The encoding device may send information to the decoding device indicating that for a certain frame type or macroblock type, due to the quantization used, a vast majority of the refinement levels fulfilling certain criteria will be equal to 0 (type-0 refinement coefficients). Additionally, the encoding device can signal to the decoding device that all type-0 coefficients levels within a certain area, e.g., within a block or makroblock are zero or not. In some cases it may be assumed that all type-0 coefficients are equal to 0. In addition, the encoding device may signal to the decoding device the criteria that may be used to distinguish between type-0 and type-1 coefficients, e.g., values of history h (discussed below) for which coefficients can be determined to be type-0 coefficients.

Figure 1B:
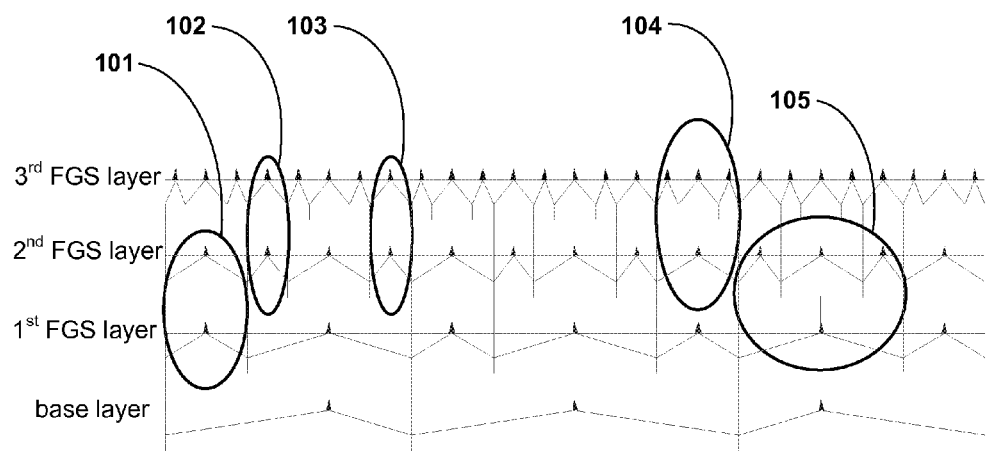

FIGS. 1A and 1B are mapping diagrams that illustrate the possible values for refinement coefficients based on a history of the corresponding transform coefficients at different layers of a scalable video coding (SVC) scheme. FIGS. 1A and 1B show possible transform coefficient values of a base layer and $1^{st}$, $2^{nd}$, and $3^{rd}$ FGS enhancement layers (also called FGS layers). FGS stands for Fine Granularity signal-to-noise Scalability, and is explained in greater detail below.

The history of any refinement coefficient can be traced back through previous transform coefficients (which may be refinement or significant coefficients) of the previous layers. In FIG. 1A, the shaded gray area of the $1^{st}$, $2^{nd}$, and $3^{rd}$ FGS enhancement layers defines significant coefficients that have values of zero. Also, each pair of coefficients on either side of the shaded gray area (FIG. 1A) of the $1^{st}$, $2^{nd}$, and $3^{rd}$ FGS enhancement layers are significant coefficients insofar as all previous layers defined values of zero for that coefficient. All other non-shaded areas in FIG. 1A correspond to refinement coefficients for which the corresponding coefficient of at least one previous layer defined a non-zero value for that coefficient.

The mapping diagrams of FIGS. 1A and 1B may correspond to a particular dead-zone parameter (f). The so-called dead-zone parameter is typically defined as:

$$f=Q/x$$

where Q represents the quantization step-size and x represents a constant for a given video block type. In ITU H.264, f=Q/3 for intra-coded blocks and f=Q/6 for inter-coded blocks. Based on this observation, different mapping diagrams (like those of FIGS. 1A and 1B) can be created for intra-coded blocks and inter-coded blocks.

The mapping diagrams of FIGS. 1A and 1B correspond to f=Q/3. Therefore, in this example, as applied to H.264, the mapping diagrams of FIGS. 1A and 1B may correspond to intra-coded blocks. In this case, if an encoder device codes a signal to indicate that one or more refinement coefficient values are excluded from the coded bitstream, a decoder device can derive such values based on history, e.g., by applying a mapping diagram like that shown in FIGS. 1A and 1B.

The dead-zone parameter (f=Q/3) is shown in FIG. 1A, but Q (the quantization step size) is labeled as Δ in FIG. 1A. Also labeled in FIG. 1A are locations of some of the decision thresholds, and locations of some of the reconstruction values $r_n$. Each refinement coefficient is defined relative to the previous layer, and may have a value of −1, 0 or 1. This is also illustrated in FIG. 1A as the possible values of $c_2$. Each solid triangle between the decision thresholds represents a possible value for a given transform coefficient. Notably, however, in some cases shown in FIGS. 1A and 1B, the only possible (or probable) value for the refinement coefficient (given the previous history) is a value of zero. In these cases, this disclosure proposes to avoid coding of the refinement coefficient at the encoder and allow derivation of the refinement coefficient at the decoder.

FIG. 1B specifically labels some of the different possibilities for some refinement coefficients. In area 104, there are three possible refinement coefficient values for the $3^{rd}$ FGS layer relative to the $2^{nd}$ FGS layer, i.e., −1, 0 and 1. In this case, the corresponding transform coefficient value in the base layer was 0, the corresponding transform coefficient value in $1^{st}$ FGS layer was 1, and the corresponding transform coefficient value in $2^{nd}$ FGS layer was 0. Given this history, the encoder and the decoder can know that there are three possible refinement coefficient values for the $3^{rd}$ FGS layer relative to the $2^{nd}$ FGS layer, i.e., −1, 0 and 1.

In area 105, there are also three possible refinement coefficient values for the $2^{nd}$ FGS layer relative to the $1^{st}$ FGS layer, i.e., −1, 0 and 1. In this case, the corresponding transform coefficient value in the base layer was 1, and the corresponding transform coefficient value in $1^{st}$ FGS layer was 0. Given this history, the encoder and the decoder can know that there are three possible refinement coefficient values for the $2^{nd}$ FGS layer relative to the $1^{st}$ FGS layer, i.e., −1, 0 and 1.

Areas 101, 102 and 103 illustrate scenarios in which the encoder and decoder know (based on the history of corresponding transform coefficients) that the refinement coefficient will have a high likelihood of being zero. This can be seen in areas 101, 102 and 103 insofar as there is only one possible coefficient value for an $n^{th}$ layer relative to the $(n-1)^{th}$ layer.

In area 101, for example, there is one possible refinement coefficient value for the $2^{nd}$ FGS layer relative to the $1^{st}$ FGS layer, i.e., 0. In this case, the corresponding transform coefficient value in the base layer was −1, and the corresponding transform coefficient value in $1^{st}$ FGS layer was −1. Given this history, the encoder and the decoder can know that the there is one possible refinement coefficient value for the $2^{nd}$ FGS layer relative to the $1^{st}$ FGS layer, i.e., 0. In this case, the probability of that refinement coefficient actually being zero is very high, and may be presumed at the decoder.

In area 102, there is also one possible refinement coefficient value for the $3^{rd}$ FGS layer relative to the $2^{nd}$ FGS layer, i.e., 0. In this case, the corresponding transform coefficient value in the base layer was −1, the corresponding transform coefficient value in $1^{st}$ FGS layer was 0, and the corresponding transform coefficient value in $2^{nd}$ FGS layer was −1. Given this history, the encoder and the decoder can know that the there is one possible refinement coefficient value for the $3^{rd}$ FGS layer relative to the $2^{nd}$ FGS layer, i.e., 0. In this case, the probability of that refinement coefficient actually being zero is very high, and may be presumed at the decoder.

In area 103, there is also one possible refinement coefficient value for the $3^{rd}$ FGS layer relative to the $2^{nd}$ FGS layer, i.e., 0. In this case, the corresponding transform coefficient value in the base layer was −1, the corresponding transform coefficient value in $1^{st}$ FGS layer was 0, and the corresponding transform coefficient value in $2^{nd}$ FGS layer was 1. Given this history, the encoder and the decoder can know that the there is one possible refinement coefficient value for the $3^{rd}$ FGS layer relative to the $2^{nd}$ FGS layer, i.e., 0. In this case, the probability of that refinement coefficient actually being zero is very high, and may be presumed at the decoder.

In short, for a given quantization level and/or dead zone parameter, the probable value for a refinement coefficient may be limited to 0 (or possibly another value) in many cases. These cases can be determined based on history of the corresponding transform coefficient in previous layers. Moreover, the type of quantization and/or dead zone parameter used in the encoding may be defined by the type of video block being coded, e.g., intra (I) or inter (P or B). The encoder may exclude such refinement coefficient values from an encoded bitstream, and may possibly signal to the decoder that such information is being excluded for one or more video block types. The decoder can generate the excluded information based on the history associated with a given refinement coefficient, e.g., the values of corresponding transform coefficients associated with the given refinement coefficient. In this manner, coding efficiency can be improved. In some cases, the history may not reflect the actual refinement coefficient values that are generated, e.g., due to quantization errors, but such cases are rare and should not degrade video quality by any significant amount.

Figure 2:
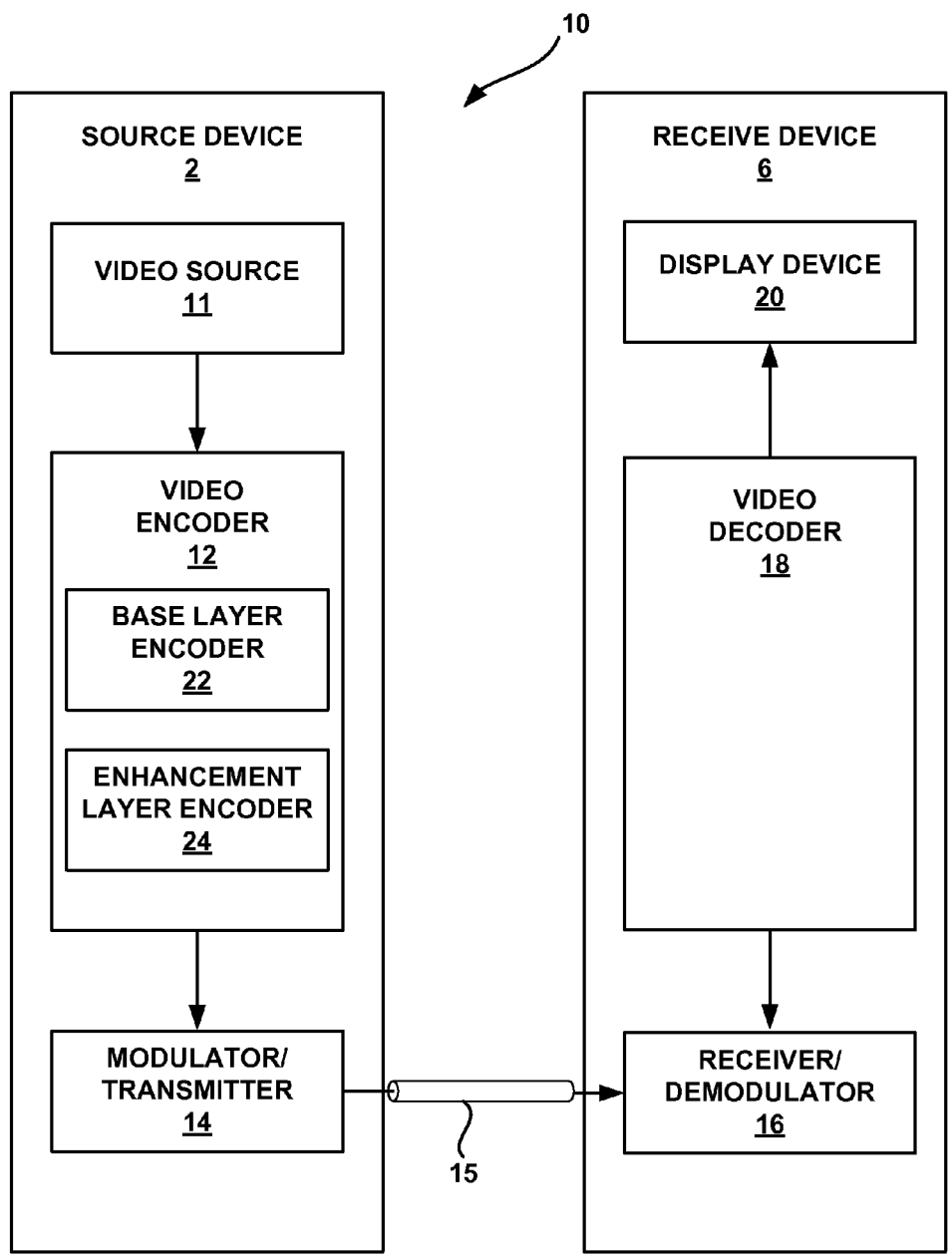
FIG. 2 is an exemplary block diagram illustrating a video encoding and decoding system.

FIG. 2 is a block diagram illustrating a video encoding and decoding system 10. As shown in FIG. 2, system 10 includes a source device 2 that transmits encoded video to a receive device 6 via a communication channel 15. Source device 2 may include a video source 11, video encoder 12 and a modulator/transmitter 14. Receive device 6 may include a receiver/demodulator 16, video decoder 18, and display device 20. System 10 may be configured to apply techniques for transform coefficient coding described herein in which values of one or more of the refinement coefficients are excluded from the transmitted bitstream and derived at receive device 6 based on the history.

Scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or signal-to-noise SNR levels. Enhancement layers may be defined relative to the previously encoded layer. Enhancement layers define at least two different types of coefficients, referred to as significant coefficients and refinement coefficients. Refinement coefficients may define values relative to the corresponding values of the previously encoded layer. Frames of enhancement layers sometimes only include a portion of the total number of video blocks in the base layer or previous enhancement layer, e.g., only those blocks for which enhancement is performed.

Significant coefficients refer to coefficients for which corresponding coefficients in previous layers had values of zero. Refinement coefficients refer to coefficients for which corresponding coefficients in a previous layer had non-zero values. Coding of transform coefficients typically involves a variable length coding (VLC) methodology in which different sets of coefficients are mapped to variable length codes in a VLC table. Variable length coding of enhancement layers typically involves a two-pass approach. A first pass is performed to variable length code the significant coefficients, and another pass is performed to variable length code the refinement coefficients. The techniques of this disclosure are particularly useful for the variable length coding of refinement coefficients.

In the example of FIG. 2, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 2 to receive device 6.

Source device 2 generates coded video data for transmission to receive device 6. In some cases, however, devices 2, 6 may operate in a substantially symmetrical manner. For example, each of devices 2, 6 may include video encoding and decoding components. Hence, system 10 may support one-way or two-way video transmission between video devices 2, 6, e.g., for video streaming, video broadcasting, or video telephony.

Video source 11 of source device 2 may include a video capture device, such as a video camera, a video archive containing previously captured video, or a video feed from a video content provider. As a further alternative, video source 11 may generate computer graphics-based data as the source video, or a combination of live video and computer-generated video. In some cases, if video source 11 is a video camera, source device 2 and receive device 6 may form so-called camera phones or video phones. In each case, the captured, pre-captured or computer-generated video may be encoded by video encoder 12 for transmission from video source device 2 to video decoder 18 of video receive device 6 via modulator/transmitter 14, communication channel 15 and receiver/demodulator 16. The video encoding and decoding processes may implement techniques of this disclosure to reduce the amount of data associated with communication of refinement coefficients, relying on derivation of type-0 coefficients at receive device 6. Display device 20 displays the decoded video data to a user, and may comprise any of a variety of display devices such as a cathode ray tube, a liquid crystal display (LCD), a plasma display, an organic light emitting diode (OLED) display, or another type of display device.

Video encoder 12 and video decoder 18 may be configured to support SVC for spatial, temporal and/or signal-to-noise ratio (SNR) scalability. In some aspects, video encoder 12 and video decoder 18 may be configured to support fine granularity SNR scalability (FGS) coding for SVC. Encoder 12 and decoder 18 may support various degrees of scalability by supporting encoding, transmission and decoding of a base layer and one or more scalable enhancement layers. Again, for scalable video coding, a base layer carries video data with a baseline level of quality. One or more enhancement layers carry additional data to support higher spatial, temporal and/or SNR levels. The base layer may be transmitted in a manner that is more reliable than the transmission of enhancement layers. For example, the most reliable portions of a modulated signal may be used to transmit the base layer, while less reliable portions of the modulated signal may be used to transmit the enhancement layers.

In order to support SVC, video encoder 12 may include a base layer encoder 22 and one or more enhancement layer encoders 24 to perform encoding of a base layer and one or more enhancement layers, respectively. The techniques of this disclosure, which involve the coding of refinement coefficients, are applicable to the coding of video blocks of enhancement layers in SVC. More specifically, the techniques of this disclosure may be applicable to VLC of refinement coefficients of video blocks of enhancement layers, although this disclosure is not necessarily limited in this respect. According to this disclosure, information indicative of derivable type-0 coefficients are excluded from the bitstream, and VLC is only applied with respect to type-1 coefficients. The values of type-0 coefficients are generated at the decoder.

Video decoder 18 may include a combined base/enhancement decoder that decodes the video blocks associated with both base and enhancement layers, and combines the decoded video to reconstruct the frames of a video sequence. Display device 20 receives the decoded video sequence, and presents the video sequence to a user.

Video encoder 12 and video decoder 18 may operate according to a video compression standard, such as MPEG-2, MPEG-4, ITU-T H.263, or ITU-T H.264/MPEG-4, Part 10, Advanced Video Coding (AVC). Although not shown in FIG. 2, in some aspects, video encoder 12 and video decoder 18 may each be integrated with an audio encoder and decoder respectively, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

The Joint Video Team (JVT) continues to work on an SVC extension to H.264/MPEG-4 AVC. The specification of the evolving SVC extension is in the form of a Joint Draft (JD). The Joint Scalable Video Model (JSVM) created by the JVT implements tools for use in scalable video, which may be used within system 10 for various coding tasks described in this disclosure. Detailed information concerning Fine Granularity SNR Scalability (FGS) coding can be found in the Joint Draft documents, and particularly in Joint Draft 6 (SVC JD6), Thomas Wiegand, Gary Sullivan, Julien Reichel, Heiko Schwarz, and Mathias Wien, "Joint Draft 6: Scalable Video Coding," JVT-S 201, April 2006, Geneva, and in Joint Draft 9 (SVC JD9), Thomas Wiegand, Gary Sullivan, Julien Reichel, Heiko Schwarz, and Mathias Wien, "Joint Draft 9 of SVC Amendment," JVT-V 201, January 2007, Marrakech, Morocco.

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). That is to say, communication channel 15 may comprise a wireless information channel used to broadcast wireless video information according to the FLO Specification, or the like. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast—terrestrial), or DMB (digital media broadcast). Hence, source device 2 may be a mobile wireless terminal, a video streaming server, or a video broadcast server. However, techniques described in this disclosure are not limited to any particular type of broadcast, multicast, or point-to-point system. In the case of broadcast, source device 2 may broadcast several channels of video data to multiple receive devices, each of which may be similar to receive device 6 of FIG. 2.

Video encoder 12 and video decoder 18 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 12 and video decoder 18 may be included in one or more encoders or decoders, either of which may be integrated as part of a combined encoder/decoder (CODEC) in a respective mobile device, subscriber device, broadcast device, server, or the like. In addition, source device 2 and receive device 6 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being modulator/transmitter 14 of source device 2 and receiver/demodulator 16 of receive device 6 in FIG. 2.

A video sequence includes a series of video frames. Video encoder 12 operates on blocks of pixels (or blocks of transform coefficients) within individual video frames in order to encode the video data. The video blocks may have fixed or varying sizes, and may differ in size according to a specified coding standard. In some cases, each video frame is a coded unit, while, in other cases, each video frame may be divided into a series of slices that form coded units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. As noted, each slice may be an independently decodable unit of a video frame.

Following intra- or inter-based predictive coding, additional coding techniques may be applied to the transmitted bitstream. These additional coding techniques may include transformation techniques (such as the 4×4 or 8×8 integer transform used in H.264/AVC or a discrete cosine transformation DCT), and transform coefficient coding (such as variable length coding of the transform coefficients). Blocks of transformation coefficients may be referred to as video blocks. In other words, the term "video block" refers to a block of video data regardless of the domain of the information. Thus, video blocks can be in a pixel domain or a transformed coefficient domain.

This disclosure provides techniques for coding of refinement coefficients. Again, refinement coefficients refer to coefficients that had non-zero values in the previous layers of the SVC scheme, whereas significant coefficients refer to coefficients that had values of zero in one or more previous layers. According to this disclosure, information indicative of some of the refinement coefficient values may be excluded from a bitstream that is transmitted from source device 2 to receive device 6. Encoder 12 and decoder 18 may perform reciprocal methods that rely on history to identify the type-0 refinement coefficients that are excluded from the bitstream because their values can be assumed to be zero. As used herein, the term coding generally refers to at least a portion of either the encoding or decoding processes. Video encoder 12 encodes the data, while video decoder 18 decodes the data.

The coding of type-1 refinement coefficients may be based on a VLC methodology that uses VLC tables to assign codewords to different sets of refinement coefficients. Sets of zero value coefficients may be represented by run lengths of zeros, and the tables may assign more probable run lengths to shorter VLC codes. Similarly, VLC tables may assign less probable run lengths to longer VLC codes. The VLC tables may be adapted relative to convention tables in order to better account for the fact that only type-1 refinement coefficients are coded using the tables, and information for type-0 coefficients is excluded from the bitstream. Again, values of the type-0 coefficients are derived at the decoder.

The formation of the VLC tables may be based on prior coding statistics, but in most cases, static VLC tables are used. Again, however, the VLC tables may be different than conventional tables because information for type-0 coefficients is excluded from the bitstream. In the case of static VLC tables encoder 12 and decoder 18 simply select one or more appropriate VLC tables from a set of possible tables for coding the refinement coefficients. Regardless of whether the VLC tables are formed or static, updates to the VLC tables could be made, as desired.

Figure 3:
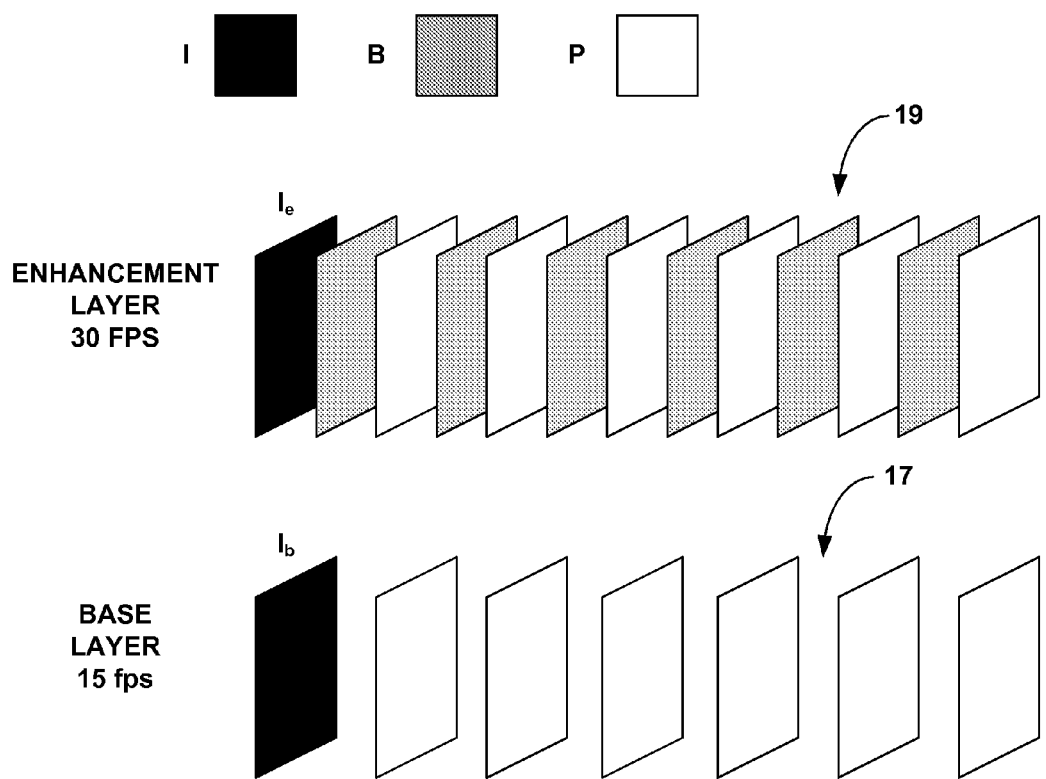
FIG. 3 is a conceptual diagram illustrating video frames of a base layer and an enhancement layer of a scalable video bitstream.

FIG. 3 is a diagram illustrating video frames within a base layer 17 and enhancement layer 18 of a scalable video bitstream. As noted above, the techniques of this disclosure are applicable to the coding of data of enhancement layers. Base layer 17 may comprise a bitstream containing encoded video data that represents the first level of spatial, temporal, or SNR scalability. Enhancement layer 18 may comprise a bitstream containing encoded video data that represents a second level of spatial, temporal and/or SNR scalability. Although a single enhancement layer is shown, several layers of enhancement may be used in some cases. The enhancement layer bitstream may be decodable only in conjunction with the base layer (or previous enhancement layer if multiple enhancement layers exist). Enhancement layer 18 contains references to the decoded video data in base layer 17. Such references may be used either in the transform domain or pixel domain to generate the final decoded video data.

Base layer 17 and enhancement layer 18 may contain intra (I), inter (P), and bi-directional (B) frames. Intra frames may include all intra-coded video blocks. I and P frames may include at least some inter-coded video blocks (inter blocks), but may also include some intra-coded blocks (intra blocks). The different frames of enhancement layer 17 need not include all of the video blocks in base layer 17. The P frames in enhancement layer 18 rely on references to P frames in base layer 17. By decoding frames in enhancement layer 18 and base layer 17, a video decoder is able to increase the video quality of the decoded video.

For example, base layer 17 may include video encoded at a minimum frame rate of e.g., 15 frames per second, whereas enhancement layer 18 may include video encoded at a higher frame rate of e.g., 30 frames per second. To support encoding at different quality levels, base layer 17 and enhancement layer 18 may be encoded with a higher quantization parameter (QP) and lower QP, respectively. Moreover, base layer 17 may be transmitted in a manner that is more reliable than the transmission of enhancement layer 18. As an example, the most reliable portions of a modulated signal may be used to transmit base layer 17, while less reliable portions of the modulated signal may be used to transmit enhancement layer 18. The illustration of FIG. 3 is merely exemplary, as base and enhancement layers could be defined in many different ways.

Figure 4:
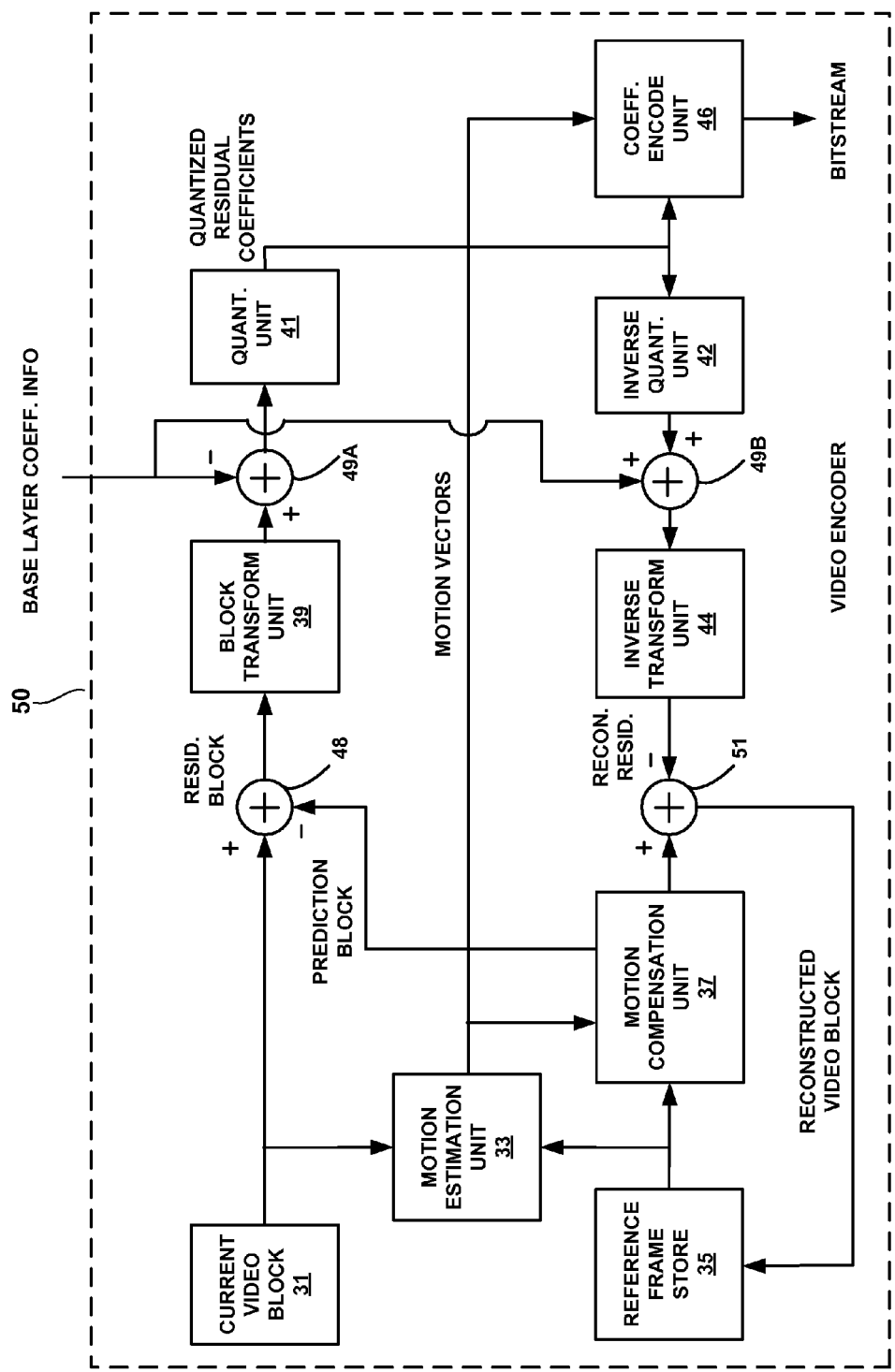
FIG. 4 is a block diagram illustrating an example of a video encoder consistent with this disclosure.

FIG. 4 is a block diagram illustrating an example of a video encoder 50 that includes a coefficient encode unit 46 to encode data consistent with this disclosure. Video encoder 50 of FIG. 4 may correspond to enhancement layer encoder 24 of source device 2 in FIG. 2. That is to say, base layer encoding components are not illustrated in FIG. 4 for simplicity. Therefore, video encoder 50 may be considered an enhancement layer encoder. Alternatively, the illustrated components of video encoder 50 could also be implemented in combination with base layer encoding modules or units, e.g., in a pyramid encoder design that supports scalable video coding of the base layer and the enhancement layer.

Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 performs motion estimation to track the movement of matching video blocks between two or more adjacent frames.

As shown in FIG. 4, video encoder 50 receives a current video block 31 (e.g., an enhancement layer video block) within a video frame to be encoded. In the example of FIG. 4, video encoder 50 includes motion estimation unit 33, reference frame store 35, motion compensation unit 37, block transform unit 39, quantization unit 41, inverse quantization unit 42, inverse transform unit 44 and coefficient encode unit 46. A deblocking filter (not shown) may also be included to filter block boundaries to remove blockiness artifacts. Video encoder 50 also includes summer 48 and summer 51. FIG. 4 illustrates the temporal prediction components of video encoder 50 for inter-coding of video blocks. Although not shown in FIG. 4 for ease of illustration, video encoder 50 also may include spatial prediction components for intra-coding of some video blocks. Spatial prediction components, however, are usually used only for base layer coding. The techniques of this disclosure can apply with respect to transform coefficients of residual blocks that are intra-coded or inter-coded.

Motion estimation unit 33 compares video block 31 to blocks in one or more adjacent video frames to generate one or more motion vectors. The adjacent frame or frames may be retrieved from reference frame store 35, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 33 identifies a block in an adjacent frame that most closely matches the current video block 31, e.g., based on a rate distortion model, and determines a displacement between the blocks. On this basis, motion estimation unit 33 produces a motion vector (MV) (or multiple MV's in the case of bidirectional prediction) that indicates the magnitude and trajectory of the displacement between current video block 31 and a predictive block used to code current video block 31.

Motion vectors may have half- or quarter-pixel precision, or even finer precision, allowing video encoder 50 to track motion with higher precision than integer pixel locations and obtain a better prediction block. When motion vectors with fractional pixel values are used, interpolation operations are carried out in motion compensation unit 37. Motion estimation unit 33 may identify the best motion vector for a video block using a rate-distortion model. Using the resulting motion vector, motion compensation unit 37 forms a prediction video block by motion compensation.

Video encoder 50 forms a residual video block by subtracting the prediction video block produced by motion compensation unit 37 from the original, current video block 31 at summer 48. Block transform unit 39 applies a transform, such as a discrete cosine transform (DCT), to the residual block, producing residual transform block coefficients. Quantization unit 41 quantizes the residual transform block coefficients to further reduce bit rate. Summer 49A receives base layer coefficient information, e.g., from a base layer encoder (not show) and is positioned between block transform unit 39 and quantization unit 41 to supply this base layer coefficient information into the enhancement layer coding. In particular, summer 49A subtracts the base layer coefficient information from the output of block transform unit 39. In a similar fashion, summer 49B, which is positioned between inverse transform unit 44 and inverse quantization unit 42, also receives the base layer coefficient information from the base layer encoder (not shown). Summer 49B adds the base layer coefficient information back to the output of inverse quantization unit 42.

Spatial prediction coding operates very similar to temporal prediction coding. However, whereas temporal prediction coding relies on blocks of adjacent frames (or other coded units) to perform the coding, spatial prediction relies on blocks of within a common frame (other coded unit) to perform the coding. Spatial prediction coding codes intra blocks, while temporal prediction coding codes inter blocks. Again, the spatial prediction components are not shown in FIG. 4 for simplicity. However, the techniques of this disclosure can apply with respect to transform coefficients that are generated by transformation that follows a spatial prediction coding process.

Coefficient encode unit 46 codes the quantized transform coefficients, e.g., according a variable length coding methodology, to even further reduce the bit rate of transmitted information. In particular, coefficient encode unit 46 applies techniques of this disclosure to code the refinement coefficients of an enhancement layer. Coefficient encode unit 46 may code significant coefficients separately from refinement coefficients, although this disclosure is not necessarily limited in this respect. With respect to refinement coefficients of an enhancement layer, coefficient encode unit 46 may distinguish between type-1 coefficients, which are coded into the bitstream, and type-0 coefficients, which are not coded into the bitstream.

Coefficient encode unit 46 may generate an in-band or out-of-band signal to indicate to a decoder that information indicative of type-0 coefficients is excluded from the bitstream and such information needs to be derived at the decoder based on the history associated with corresponding transform coefficients. Although the techniques described herein assume a two-pass approach in which significant coefficients are coded separately from refinement coefficients, the techniques could also apply in a one pass approach in which significant coefficients are coded with the refinement coefficients. In either case, according to this disclosure, information indicative of the type-0 refinement coefficients is excluded from the bitstream, and derived at the decoder based on history of the corresponding transform coefficients of previous layers.

Following the coding of the transform coefficients (including the significant coefficients, the type-1 refinement coefficients and type-0 refinement coefficients), the encoded video (e.g., variable length codewords) may be transmitted to another device. In addition, inverse quantization unit 42 and inverse transform unit 44 apply inverse quantization and inverse transformation, respectively, to reconstruct the residual block. Summer 51 adds the reconstructed residual block to the motion compensated prediction block produced by motion compensation unit 37 to produce a reconstructed video block for storage in reference frame store 35. The reconstructed video block is used by motion estimation unit 33 and motion compensation unit 37 to encode a block in a subsequent video frame.

Figure 5:
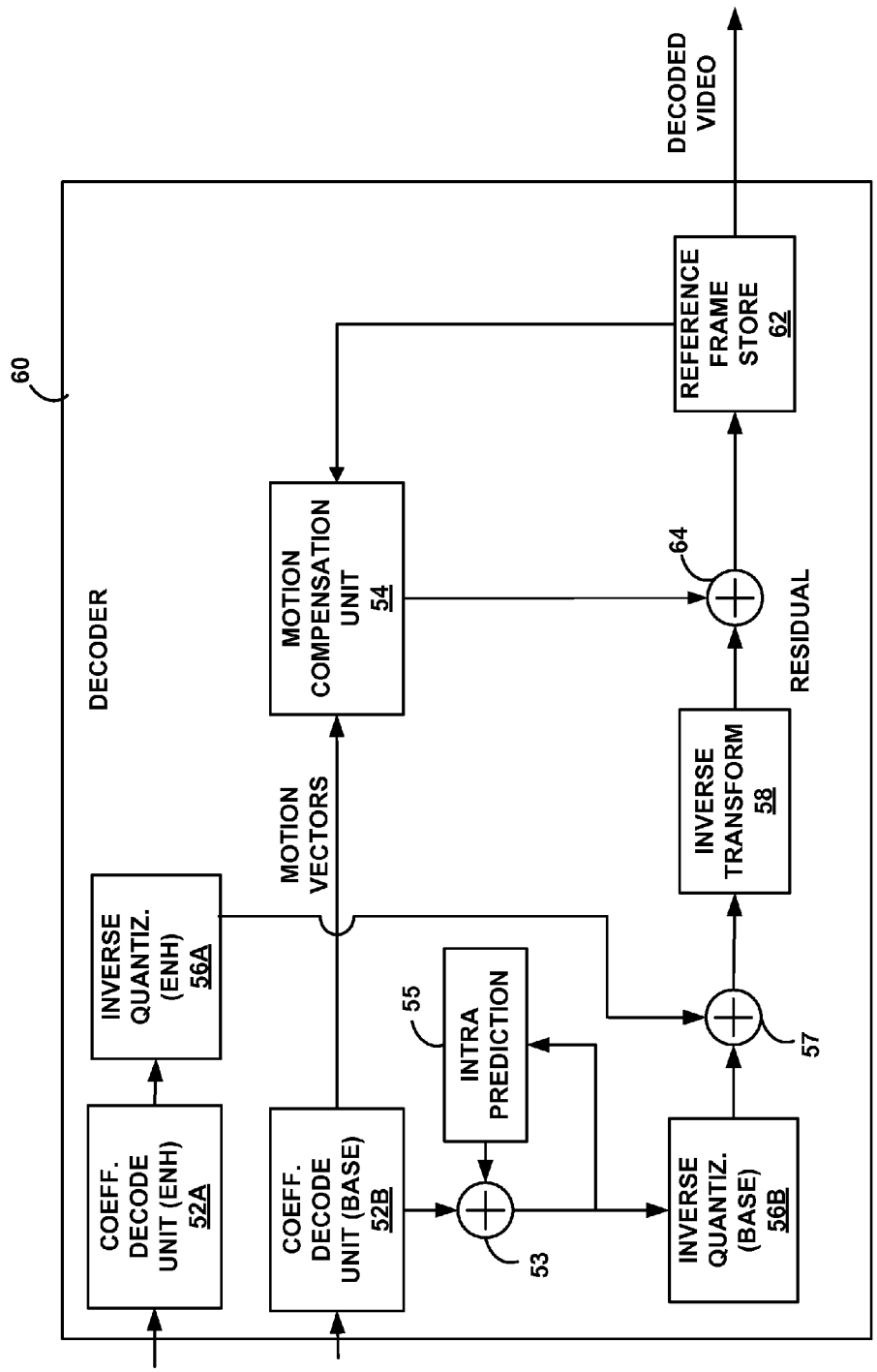
FIG. 5 is a block diagram illustrating an example of a video decoder consistent with this disclosure.

FIG. 5 is a block diagram illustrating an example of a video decoder 60, which may correspond to video decoder 18 of FIG. 1 that performs base layer and enhancement layer decoding. Video decoder 60 includes a coefficient decode unit 52A that performs the reciprocal function of coefficient encode unit 46 of FIG. 4. That is to say, coefficient decode unit 52A codes the refinement coefficients of an enhancement layer in a manner that assumes that information indicative of type-0 coefficients are excluded from the bitstream. Coefficient decode unit 52A uses the history of corresponding transform coefficients, e.g., corresponding to the type-0 refinement coefficients of the current layer being coded, to generate the values associated with the type-0 refinement coefficients, which are excluded from the bitstream.

Video decoder 60 may perform intra- and inter-decoding of blocks within video frames. In the example of FIG. 5, video decoder 60 includes coefficient decode units 52A and 52B, motion compensation unit 54, inverse quantization unit 56, inverse transform unit 58, and reference frame store 62. Video decoder 60 also includes summer 64, which combines the outputs of inverse transmit unit 58 and motion compensation unit 54. Optionally, video decoder 60 also may include a deblocking filter (not shown) that filters the output of summer 64. FIG. 5 illustrates the temporal prediction components of video decoder 60 for inter-decoding of video blocks. Video decoder 60 may also includes spatial prediction components for intra-decoding of some video blocks, which is represented by intra prediction unit 55.

Video decoder 60 may also include another coefficient decode unit 52B for base layer information. Coefficient decode unit 52B may generally operate in a conventional manner with respect to the decoding of base layer coefficients. Intra prediction unit 55 may optionally perform any spatial decoding of base layer video blocks, and the output of intra prediction unit 55 may be provided to adder 53. The enhancement layer path may include inverse quantization unit 58A, and the base layer path may include inverse quantization unit 56B. The information in the base layer and enhancement layer paths may be combined by adder 57.

Video decoder 60 may perform intra- and inter-decoding of blocks within video frames. In the example of FIG. 5, video decoder 60 includes coefficient decode units 52A and 52B (mentioned above), motion compensation unit 54, inverse quantization units 56A and 56B, inverse transform unit 58, and reference frame store 62. Video decoder 60 also includes summer 64. Optionally, video decoder 60 also may include a deblocking filter (not shown) that filters the output of summer 64. Again, summer 57 combines information in the base layer and enhancement layer paths, and intra prediction unit 55 and adder 53 facilitate any spatial decoding of base layer video blocks.

Again, coefficient decode unit 52A receives the encoded video bitstream and applies the techniques described in this disclosure. In particular, for significant coefficients, coefficient decode unit 52A may decode information using a VLC table. Similarly, for type-1 refinement coefficients, coefficient decode unit 52A may decode information using a VLC table, which may be a different VLC table than that used for the significant coefficients. For type-0 refinement coefficients, however, coefficient decode unit 52A may generate the appropriate values based on a history associated with the corresponding transform coefficients of previous layers of the SVC scheme.

Following the decoding performed by coefficient decode unit 52A, motion compensation unit 54 receives the motion vectors and one or more reconstructed reference frames from reference frame store 62. Inverse quantization unit 56A inverse quantizes, i.e., de-quantizes, the quantized block coefficients. Following combination of the enhancement and base layer information by adder 57, inverse transform unit 58 applies an inverse transform, e.g., an inverse DCT, to the coefficients to produce residual blocks. Motion compensation unit 54 produces motion compensated blocks that are summed by summer 64 with the residual blocks to form decoded blocks. If desired, a deblocking filter may also be applied to filter the decoded blocks in order to remove blockiness artifacts. The filtered blocks are then placed in reference frame store 62, which provides reference blocks from motion compensation and also produces decoded video to a drive display device (such as device 20 of FIG. 2).

Figure 6:
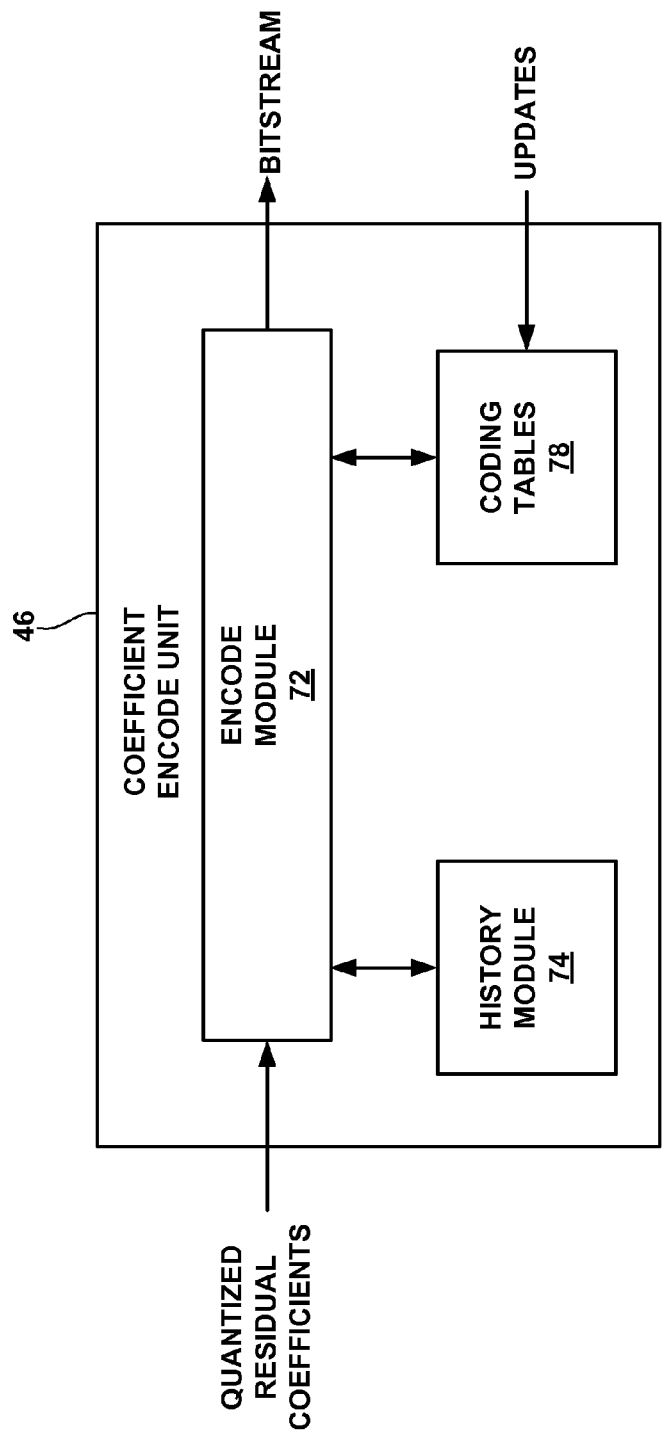
FIG. 6 is an exemplary block diagram of a coefficient encode unit consistent with this disclosure.

FIG. 6 is a block diagram illustrating an exemplary coefficient encode unit 46, which may correspond to that shown in FIG. 4. Coefficient encode unit 46 includes an encode module 72, a history module 74, a table selection module 76, and coding tables 78. Coding tables 78 generally refer to tables that may be stored in any location, e.g., locally or off-chip in a separate memory location. Coding tables 78 may be updated, periodically, as desired.

Encode module 72 encodes refinement coefficients and significant coefficients in separate coding passes, although the techniques of this disclosure could also apply if refinement coefficients were coded with the significant coefficients. Table selection by encode module 72 may be performed based on information (e.g., statistics) gathered for previously coded block of previously coded frames. For example, encode module 72 may perform statistical analysis of previously encoded frames to facilitate table selection.

Regardless of how tables are selected from coding tables 78, encode module 72 applies techniques of this disclosure to exclude information indicative of type-0 refinement coefficients from the encoded bitstream. Encode module 72 codes information, such as one or more bits in a frame header, to signal to a decoder that the information for type-0 refinement coefficient values is excluded from the bitstream.

History module 74 examines the history associated with the refinement coefficients to determine whether the refinement coefficients are type-1 coefficients or type-0 coefficients. More specifically, when coding a current FGS layer, history module 74 examines the history of corresponding transform coefficients of previous FGS layers and the base layer of the SVC scheme. As shown in FIGS. 1A and 1B, and described above, some refinement coefficients may have values that can be assumed to be zero. History module 74 examines the history to identify such so-called type-0 coefficients. Encode module 72 can then exclude information indicative of the values of the type-0 coefficients from the bitstream.

As a coding alternative to a complete history analysis, history module 72 could simply look at the values associated with corresponding coefficients the preceding FGS layer (e.g., only the most recent history). That is, in the coding of an $n^{th}$ layer of an SVC scheme, history module 74 may evaluate the history by determining whether refinement coefficient values associated with an $(n-1)^{th}$ layer of the SVC scheme had non-zero values. In this case, encode module 72 may assume that refinement coefficient values are zero for the $n^{th}$ layer when corresponding coefficients of the $(n-1)^{th}$ layer had non-zero values.

In another example, history module 74 may evaluate the history by assigning index values for refinement coefficients of the current layer, the index values being dependent upon corresponding transform coefficient values associated with the one or more previous layers of the SVC scheme. In other words, an index value (h) may be assigned based on corresponding transform coefficient values of previous layers in the SVC scheme. As an example, the index value (h) may be calculated as follows

```
h=0
for (i=0; i<n; i++){
    sig=(c_i !=0)? 1: 0;
    h=h+sig*(2<<i);
}
``` where i is the layer number (i.e., i=0 corresponds to base layer, i=1, corresponds to first base layer), and $c_i$ is the value of the collocated coefficient at layer i. i++ refers to i=i+1, and sig is an intermediate variable.

Encode module 72 may signal to the decoder for which values of index (h) the refinement coefficients are assumed to be zero. In this case, estimating the one or more refinement coefficient values associated with the current layer of the SVC scheme may comprise assigning values of zero to refinement coefficients of the current layer that have index values that correspond to one or more pre-defined index values.

In some cases, all type-0 refinement coefficients values are set to 0 in both the encoder and decoder even if their quantized value is different than zero. Since the amount of nonzero values will be very small, the impact on the reconstructed quality may be outweighed by bitrate savings that can result for excluding information from the bitstream for these type-0 coefficients.

Alternatively, encode module 72 could signal to the decoder that all type-0 coefficients values within a certain area, e.g., within block or macroblock, are zero. If not all type-0 values are actually equal to 0 (e.g., due to quantization), they could be encoded together with the remaining type-1 refinement coefficients values. The method of encoding type-1 refinement coefficient for macroblocks in which all type-0 refinement coefficients levels are equal to 0 should be different (e.g., a different VLC used) than encoding refinement coefficients in the macroblock in which some of the type-0 refinement coefficients are nonzero. In the former case, the probability of any refinement coefficient being zero is much smaller the latter case.

In another example, history module 74 may define a first subset of the refinement coefficients of the enhancement layer as type-0 refinement coefficients, and define a second subset of the refinement coefficients of the enhancement layer as type-1 refinement coefficients, e.g., based on a history such as that illustrated in FIGS. 1A and 1B. Encode module 72 can include information for the type-1 refinement coefficients in an encoded bitstream, and exclude information for the type-0 refinement coefficients in an encoded bitstream. Encode module 72 can then signal to the decoder that information for type-0 refinement coefficients is excluded.

As described herein, refinement coefficients may have values restricted to −1, 0 and 1. Such values may be coded in many ways. In one example, two bits of information are used to code refinement coefficients. The first bit may indicate whether the coefficient is equal to 0 or not, and the second bit may indicate whether the sign (denoted as $s_n$) of the refinement coefficient same (coeff_ref_dir_flag=0) or different (coeff_ref_dir_flag=1) than the sign (denoted as $s_{n-1}$) of the corresponding coefficient of the previous layer. The previous layer is denoted as $s_{n-1}$. If the sign of current coefficient is the same as that of the previous layer, then coeff_ref_dir_flag=0, and if the sign of current coefficient is different than that of the previous layer then coeff_ref_dir_flag=1. The two refinement bits may be combined into an alphabet of three refinement symbols as follows in Table 1:

TABLE 1

| coeff_ref_flag | coeff_ref_dir_flag | ref_symbol |
|---|---|---|
| 0 | — | 0 |
| 1 | 0 | 1 |
| 1 | 1 | 2 |

Alternatively, another scheme could also be used to code the refinement coefficients without departing from the techniques of this disclosure.

Coding tables 78 may comprise variable length codewords that are mapped to different sets of coefficients, which may be defined by symbols, flags, or other types of bits. Coding tables 78 may be updated, as desired. Any number of tables may be included in Coding tables 78. In some cases, two tables are used, although more could be included. The coding table used at any particular time in the coding scheme may be selected by encode module 72, e.g., based on content, or other factors.

Table 2 provides one example of a VLC table that could be used for coding refinement coefficients.

TABLE 2

| Group of ref symbol | Code length | Codeword |
|---|---|---|
| {0, 0, 0} | 1 | 1 |
| {0, 0, 1} | 4 | 0011 |
| {0, 0, 2} | 5 | 00101 |
| {0, 1, 0} | 3 | 011 |
| {0, 1, 1} | 6 | 000101 |
| {0, 1, 2} | 8 | 00000101 |
| {0, 2, 0} | 5 | 00100 |
| {0, 2, 1} | 7 | 0000101 |
| {0, 2, 2} | 9 | 000000101 |
| {1, 0, 0} | 3 | 010 |
| {1, 0, 1} | 6 | 000100 |
| {1, 0, 2} | 8 | 00000100 |
| {1, 1, 0} | 6 | 000011 |
| {1, 1, 1} | 9 | 000000100 |
| {1, 1, 2} | 10 | 0000000011 |
| {1, 2, 0} | 7 | 0000100 |
| {1, 2, 1} | 10 | 0000000010 |
| {1, 2, 2} | 12 | 000000000011 |
| {2, 0, 0} | 5 | 00011 |
| {2, 0, 1} | 7 | 0000011 |
| {2, 0, 2} | 9 | 000000011 |
| {2, 1, 0} | 8 | 00000011 |
| {2, 1, 1} | 10 | 0000000001 |
| {2, 1, 2} | 12 | 000000000010 |
| {2, 2, 0} | 9 | 000000010 |
| {2, 2, 1} | 12 | 000000000001 |
| {2, 2, 2} | 12 | 000000000000 |

As shown in Table 2, different sets of refinement coefficients (as defined in Table 1) may be mapped to the different variable length codewords. Table 2 also lists the respective bit lengths associated with different codewords. The codeword mappings to different sets of refinement coefficients may differ in different VLC tables. Accordingly, by selecting the appropriate table, coding efficiency may be achieved. According to this disclosure, different coding tables may be used depending on whether a given frame or video block includes type-0 coefficients, whose information is excluded from the coded bitstream.

Figure 7:
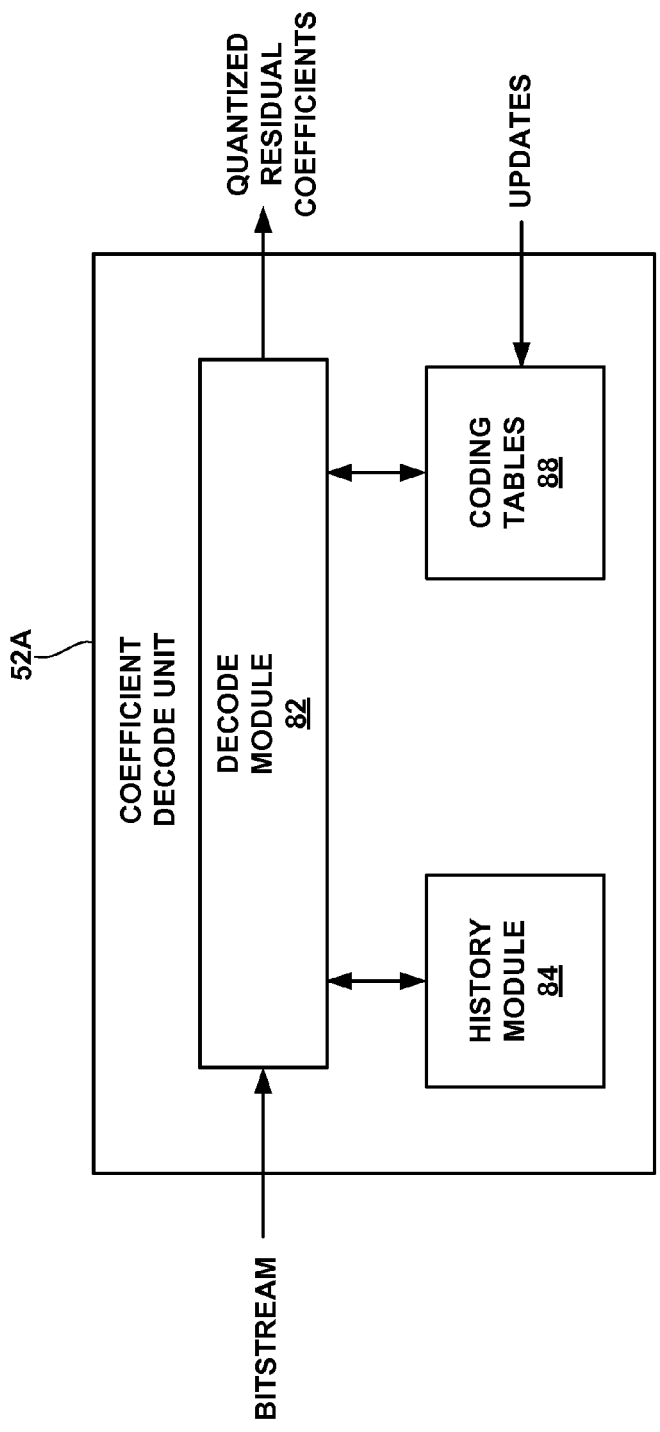
FIG. 7 is an exemplary block diagram of a coefficient decode unit consistent with this disclosure.

FIG. 7 is a block diagram illustrating an exemplary coefficient decode unit 52A, which may correspond to that shown in FIG. 5. Coefficient decode unit 52A performs reciprocal decoding functions relative to the encoding that is performed by coefficient encode unit 46. Thus, whereas coefficient encode unit 46 receives quantized residual coefficients (referred to as herein as the transform coefficients) and generates a bitstream, coefficient decode unit 52A receives a bitstream and generates quantized residual coefficients. Coefficient decode unit 52A includes a decode module 82, a history module 84, and a set of coding tables 88. Like in unit 46, coding tables 88 of unit 52A generally refer to tables that may be stored in any location, e.g., locally or off-chip in a separate memory location. Coding tables 88 may comprise VLC tables and may be updated periodically, as desired. Any number of tables may be included in coding tables 88. In some cases two tables are used, although more could be included.

Coefficient decode unit 82 may perform separate decoding passes for significant coefficients and refinement coefficients. In that case, the techniques of this disclosure may be applicable to the coding or refinement coefficients only. Alternatively, the techniques of this disclosure could apply to a coding scheme that coded both significant coefficients and refinement coefficients together in a coding pass. In any case, the decoding performed by coefficient decode unit 52A may be generally reciprocal to the encoding performed by coefficient encode unit 46.

In particular, coefficient decode module 82 may decode the bitstream knowing that information of some refinement coefficients values (e.g., type-0 coefficients) is excluded from the bitstream. The bitstream may include a signal to indicate this fact to coefficient decode unit 82. In this case, history module 84 may perform a generally reciprocal history assessment technique to that performed by history module 74 (FIG. 6).

In general, coefficient decode unit 52A codes refinement coefficients of an enhancement layer in an SVC scheme. History module 84 evaluates the history of transform coefficient values associated with one or more previous layers of the SVC scheme, and decode module 82 estimates one or more refinement coefficient values associated with a current layer of the SVC scheme based on the history. The other coefficients, which are included in the transmitted bitstream, are decoded using coding tables 88. In particular, decode module 82 performs table lookups into one or more coding tables 88 to decode codewords in the bitstream to generate the coded coefficients.

History module 84 may define a first subset of the refinement coefficients of the enhancement layer as type-0 refinement coefficients, and define a second subset of the refinement coefficients of the enhancement layer as type-1 refinement coefficients. Decode module 82 can then decode information for the type-1 refinement coefficients from the encoded bitstream, and generate information for the type-0 refinement coefficients. Again, the information for the type-0 refinement coefficients is excluded from the encoded bitstream.

Table 2 above can also be viewed as one of coding tables 88. However, whereas coding tables 78 (FIG. 6) map sets of coefficients to variable length codewords, coding tables 88 (FIG. 7) map the variable length codewords back to sets of coefficients. In this way, the decoding performed by coefficient decode unit 52A can be viewed as being reciprocal to the encoding performed by coefficient encode unit 46.

Figure 8:
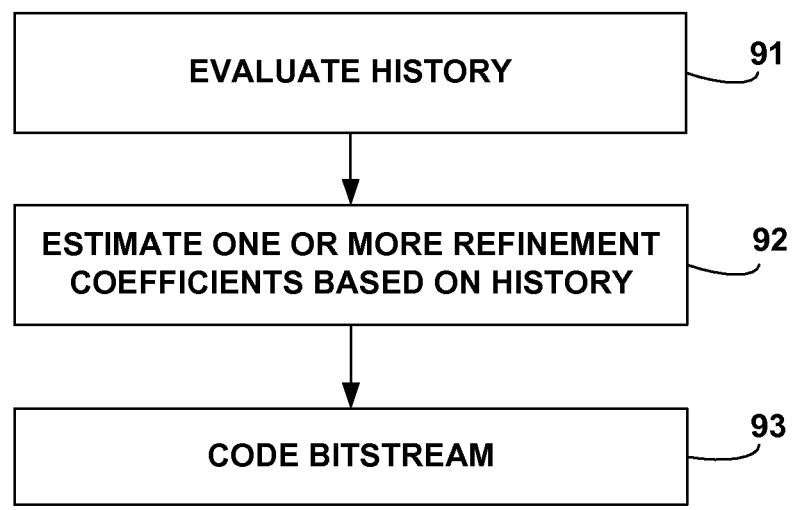
FIG. 8 is a flow diagram illustrating a coding technique for coding refinement coefficients consistent with this disclosure.

FIG. 8 is a flow diagram illustrating a coding technique for refinement coefficients of an enhancement layer of an SVC scheme consistent with this disclosure. The coding process of FIG. 8 applies to both encoding and decoding. As shown in FIG. 8, a history module 74, 84 evaluates a history of transform coefficient values associated with one or more previous layers of the SVC scheme (91). Coding module 72, 84 estimates one or more refinement coefficient values associated with a current layer of the SVC scheme based on the history (92). Coding module 72, 84 then codes the bitstream (93). On the encoding side, the process of coding the bitstream may include excluding information for one or more refinement coefficient values from the bitstream and signaling to the decoder that such information is excluded from the bitstream. On the decoding side, the process of coding the bitstream may include parsing the bitstream to identify information that signals to the decoder that information is excluded from the bitstream, and generating such excluded information based on the history associated with one or more previous layers of the SVC scheme.

Figure 9:
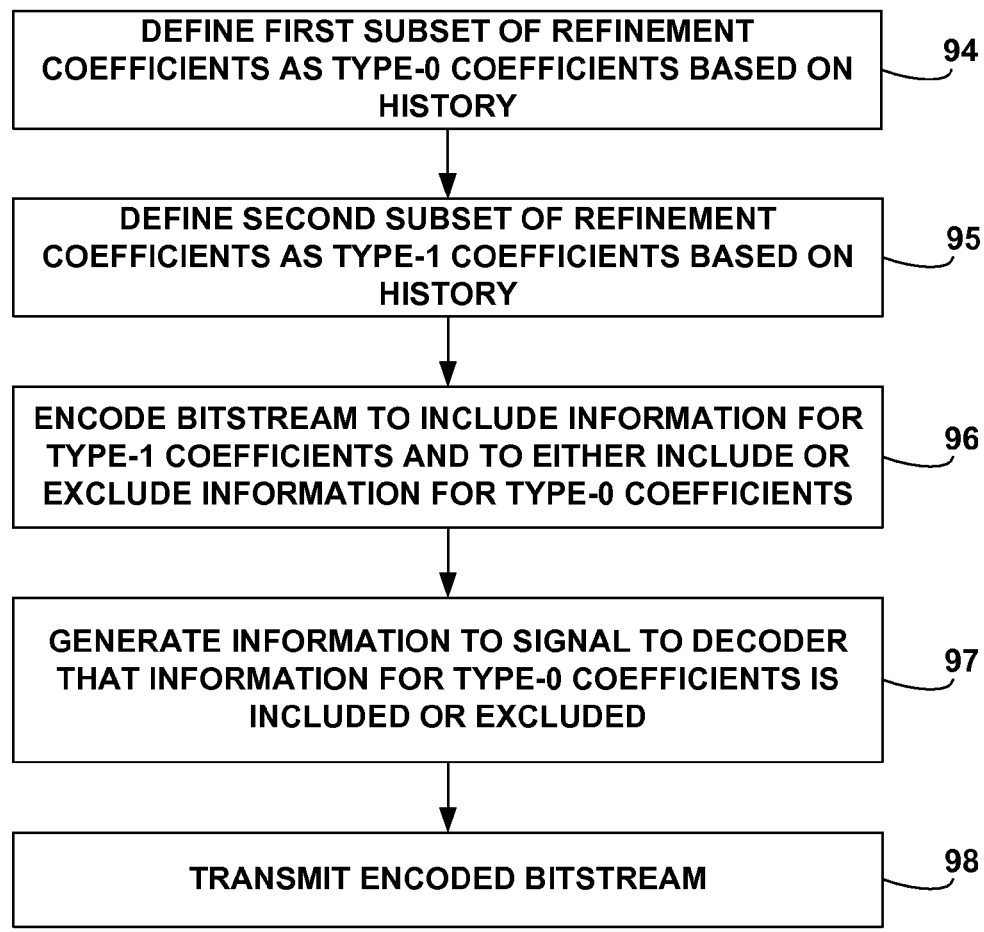
FIG. 9 is a flow diagram illustrating techniques for encoding and transmitting refinement coefficient information consistent with this disclosure.

FIG. 9 is a flow diagram illustrating techniques for encoding and transmitting refinement coefficient information consistent with this disclosure. As shown in FIG. 9, history module 74 defines a first subset of refinement coefficients as type-0 coefficients based on history associated with corresponding transform coefficients of one or more previous layers of the SVC scheme (94). Referring again to FIG. 1B, area 101 shows a type-0 coefficient in the $2^{nd}$ FGS layer, area 102 shows a type-0 coefficient in the $3^{rd}$ FGS layer, and area 103 shows a type-0 coefficient in the $3^{rd}$ FGS layer. In each of these cases, the prior history mandates or predicts that the coefficient will most probably have a value of zero. Although quantization affects could cause one or more type-0 coefficient to have a non-zero value (against probabilities), the assumption that type-0 coefficients have values of zero may generally be a robust assumption that can be applied at the decoder to derive. In other words, type-0 coefficients can actually be zero or non-zero, but have a high probability of being zero.

History module 74 also defines a second subset of refinement coefficients as type-1 coefficients based on history associated with corresponding transform coefficients of one or more previous layers of the SVC scheme (95). Referring again to FIG. 1B, area 104 shows a type-1 coefficient in the $3^{rd}$ FGS layer, and area 105 shows a type-1 coefficient in the $2^{nd}$ FGS layer. In each of these cases, the prior history mandates or predicts that the coefficient can have several possible values, e.g., 1, 0 or −1.

Encode module 72 encodes the bitstream to include information for type-1 coefficients and to include or exclude information for type-0 coefficients (96). In particular, encode module 72 may perform a variable length coding technique, such as run-length coding or coded block pattern coding in which patterns of coefficients or runs of zeros are mapped to variable length code words via coding tables. In this case, shorter variable length code words may correspond to more probable patterns or zero-run lengths, and longer variable length code words may correspond to less probable patterns or zero-run lengths. In any case, this coding only considers the type-1 coefficients, and essentially skips the type-0 coefficients.

Encode module 72 also generates information to signal to the decoder whether the information (values) for type-0 coefficients is included or excluded from the bitstream (97). This generated information may signal that information is excluded from the bitstream for type-0 coefficients, and allows the decoder to know is the table-based coding applied only to type-1 coefficients, and are values of type-0 coefficients excluded from the bitstream. The decoder is able to identify and distinguish type-0 coefficients from type-1 coefficients, so the decoder can generate the information for type-0 coefficients if they are excluded from the bitstream and decode the bitstream to reconstruct the type-1 coefficients. After the encoding is performed to generate the bitstream, the bitstream is transmitted (98), e.g., from a source device 2 to a receive device 6 via modulator/transmitter 14, channel 15 and receiver/demodulator 16 (see FIG. 2).

Figure 10:
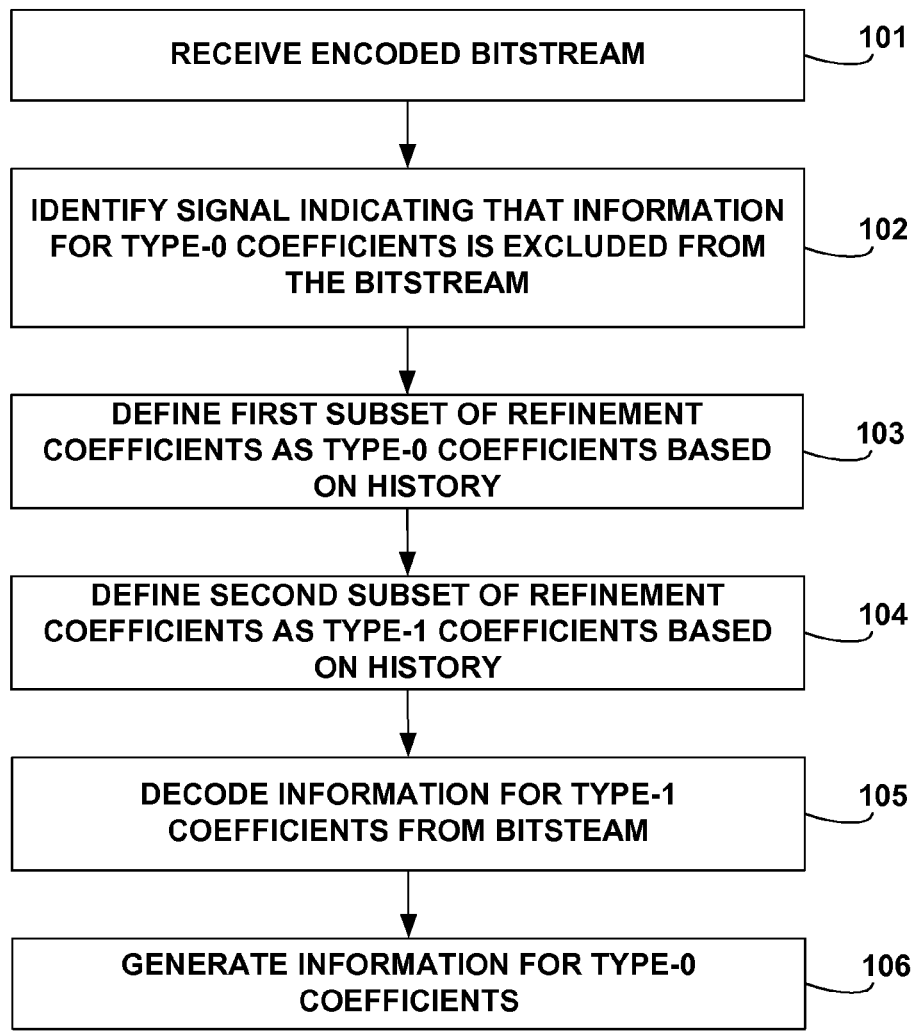
FIG. 10 is a flow diagram illustrating techniques for receiving and decoding refinement coefficient information consistent with this disclosure.

FIG. 10 is a flow diagram illustrating techniques for receiving and decoding refinement coefficient information consistent with this disclosure. As shown in FIG. 10, receiver/demodulator 16 receives the encoded bitstream (101). Receiver/demodulator 16 may perform physical layer demodulation and forward the bitstream to a decoder 18. In particular, video decoder 18 may perform the techniques of this disclosure to decode refinement coefficient information. To do so, decoder 18 may include a coefficient decode unit 52A as described above.

Decode module 82 of unit 52A identifies a signal in the bitstream indicating that information for type-0 coefficients is excluded from the bitstream (102). The signal may comprise a frame or block header coded to convey that such information is excluded from the bitstream. History module 84 defines a first subset of refinement coefficients as type-0 coefficients based on history associated with corresponding transform coefficients of one or more previous layers of the SVC scheme (103). Again, referring to FIG. 1B, areas 101, 102 and 103 show exemplary type-0 coefficients in various FGS layer. In each of these areas 101, 102 and 103, the prior history mandates or predicts that the coefficient will have a high probability of being zero.

History module 84 also defines a second subset of refinement coefficients as type-1 coefficients based on history associated with corresponding transform coefficients of one or more previous layers of the SVC scheme (104). Referring again to FIG. 1B, areas 104 and 105 shows exemplary type-1 coefficients different FGS layers. Each of these cases, the prior history mandates or predicts that the coefficient can have several possible values, e.g., 1, 0 or −1.

Decode module 82 decodes information for type-1 coefficients from the bitstream (105). In particular, decode module 82 may perform a variable length decoding by performing codeword lookups into coding tables 88. The codewords may be part of the bitstream and map to sets of coefficients that correspond to the coded type-1 coefficients. Again, shorter variable length code words may correspond to more probable patterns of coefficients or zero-run lengths of coefficients, and longer variable length code words may correspond to less probable patterns of coefficients or zero-run lengths of coefficients. In any case, this coding only considers the type-1 coefficients.

Decode module 82 generates information for type-0 coefficients 106. Thus, decode module 82 is able to distinguish type-0 coefficients from type-1 coefficients insofar as history module 84 identifies such distinctions based on history associated with the corresponding transform coefficients. In particular, decode module 82 may assume that all type-0 coefficients have values of zero, and may generate such zeros and insert them into the decoded video blocks, e.g., in the location of any type-0 coefficient identified by history module 82.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

This disclosure may also be directed to a circuit, such as an integrated circuit, chipset ASIC, FPGA, logic or various combinations thereof configured to perform one or more of the techniques described herein. Accordingly, this disclosure also contemplates a circuit configured to perform any of the techniques described above. For example, this disclosure may provide a circuit configured to code refinement coefficients of an enhancement layer in an SVC scheme, wherein the circuit is configured to evaluate a history of transform coefficient values associated with one or more previous layers of the SVC scheme, and estimate one or more refinement coefficient values associated with a current layer of the SVC scheme based on the history.

Various embodiments of the invention have been described. These and other embodiments are within the scope of the following claims.

The invention claimed is:

1. A method of decoding a set of refinement coefficients of an enhancement layer in a scalable video coding (SVC) scheme, the method comprising:
receiving an encoded bitstream;
receiving a signal indicating that a first subset of refinement coefficients, defined as refinement coefficients with a high probability of being zero, are not coded into the encoded bitstream;
decoding a second subset of refinement coefficients from the encoded bitstream, wherein the second subset of refinement coefficients are refinement coefficients that do not qualify as belonging to the first subset and wherein the second subset of refinement coefficients are those that do not define a high probability of being zero based on history of corresponding transform coefficient values associated with one or more previous layers of the SVC scheme; and
generating information that estimates a particular refinement coefficient of the first subset of refinement coefficients based on assigned index values dependent upon the particular refinement coefficient values associated with the one or more previous layers of the SVC scheme, wherein the assigned index values are assigned for refinement coefficients of the enhancement layer, the index values being dependent upon corresponding transform coefficient values associated with the one or more previous layers of the SVC scheme, wherein a given index value (h) is calculated as follows:
h=0
for (i=0; i<n; i++){
  sig=($c_i$=0)? 1: 0;
  h=h+sig*(2<<i);
}
where i is a layer number, $c_i$ is a value of a collocated coefficient at layer i, i++ refers to i=i+1, and sig is an intermediate variable.

2. The method of claim 1, wherein the encoded bitstream is a variable length coded bitstream.

3. The method of claim 1, wherein the signal indicating that a first subset of refinement coefficients are not coded into the bitstream is an out-of-band signal.

4. A device that decodes refinement coefficients of an enhancement layer in a scalable video coding (SVC) scheme, the device comprising one or more processors and a memory configured to:
receive an encoded bitstream;
receive a signal indicating that a first subset of refinement coefficients, defined as refinement coefficients with a high probability of being zero, are not coded into the encoded bitstream;
decode a second subset of refinement coefficients from the encoded bitstream, wherein the second subset of refinement coefficients are those that do not qualify as belonging to the first subset and wherein the second subset of refinement coefficients are those that do not define a high probability of being zero based on history of corresponding transform coefficient values associated with one or more previous layers of the SVC scheme; and
generate information that estimates a particular refinement coefficient of the first subset of refinement coefficients based on assigned index values dependent upon the particular refinement coefficient values associated with the one or more previous layers of the SVC scheme, wherein the assigned index values are assigned for refinement coefficients of the enhancement layer, the index values being dependent upon corresponding transform coefficient values associated with the one or more previous layers of the SVC scheme, wherein a given index value (h) is calculated as follows:
h=0
for (i=0; i<n; i++){
  sig=($c_i$=0)? 1: 0;
  h=h+sig*(2<<i);
}
where i is a layer number, $c_i$ is a value of a collocated coefficient at layer i, i++ refers to i=i+1, and sig is an intermediate variable.

5. The device of claim 4, wherein the encoded bitstream is a variable length coded bitstream.

6. The device of claim 4, wherein the signal indicating that a first subset of refinement coefficients are not coded into the bitstream is an out-of-band signal.

7. A non-transitory computer-readable medium comprising instructions that upon execution in a video decoding device cause the device to decode refinement coefficients of an enhancement layer in a scalable video coding (SVC) scheme, wherein the instructions cause the device to:
identify a signal indicating that a first subset of refinement coefficients, defined as refinement coefficients with a high probability of being zero, are not coded into a received encoded bitstream;
decode a second subset of refinement coefficients from the encoded bitstream, wherein the second subset of refinement coefficients are those that do not qualify as belonging to the first subset and wherein the second subset of refinement coefficients are those that do not define a high probability of being zero based on history of corresponding transform coefficient values associated with one or more previous layers of the SVC scheme; and generate information that estimates a particular refinement coefficient of the first subset of refinement coefficients based on assigned index values dependent upon the particular refinement coefficient values associated with the one or more previous layers of the SVC scheme, wherein the assigned index values are assigned for refinement coefficients of the enhancement layer, the index values being dependent upon corresponding transform coefficient values associated with the one or more previous layers of the SVC scheme, wherein a given index value (h) is calculated as follows:

h=0
for (i=0; i<n; i++){
  sig=($c_i$=0)? 1: 0;
  h=h+sig*(2<<i);
}
where i is a layer number, $c_i$ is a value of a collocated coefficient at layer i, i++ refers to i=i+1, and sig is an intermediate variable.

8. The non-transitory computer-readable medium of claim 7, wherein the encoded bitstream is a variable length coded bitstream.

9. The non-transitory computer-readable medium of claim 7, wherein the signal indicating that a first subset of refinement coefficients are not coded into the bitstream is an out-of-band signal.

10. A method of decoding refinement coefficients of an enhancement layer in a scalable video coding (SVC) scheme, the method comprising:

evaluating a history of transform coefficient values associated with one or more previous layers of the SVC scheme by assigning index values for refinement coefficients of the enhancement layer, the index values being dependent upon corresponding transform coefficient values associated with the one or more previous layers of the SVC scheme, wherein a given index value (h) is calculated as follows:

h=0
for (i=0; i<n; i++){
  sig=($c_i$=0)? 1: 0;
  h=h+sig*(2<<i);
}
where i is a layer number, $c_i$ is a value of a collocated coefficient at layer i, i++ refers to i=i+1, and sig is an intermediate variable;

defining a first subset of the refinement coefficients of the enhancement layer as type-0 refinement coefficients, based on the assigned index values dependent upon the transform coefficient values associated with the one or more previous layers of the SVC scheme, wherein the type-0 refinement coefficients are those that define a high probability of being zero based on the history of corresponding transform coefficient values associated with the one or more previous layers of the SVC scheme;

defining a second subset of the refinement coefficients of the enhancement layer as type-1 refinement coefficients based on the assigned index values dependent upon corresponding transform coefficient values associated with the one or more previous layers of the SVC scheme, wherein the type-1 refinement coefficients are those that do not qualify as type-0 coefficients and wherein the type-1 refinement coefficients are those that do not define a high probability of being zero based on the history of corresponding transform coefficient values associated with the one or more previous layers of the SVC scheme;

decoding information for the type-1 refinement coefficients from an encoded bitstream; and generating information that estimates one or more of the type-0 refinement coefficient values associated with the enhancement layer based on the assigned index values dependent upon corresponding transform coefficient values associated with one or more previous layers of the SVC scheme, wherein the type-0 refinement coefficients are not coded into the encoded bitstream, wherein generating the information comprises assigning values of zero to refinement coefficients of the enhancement layer that have index values that correspond to one or more pre-defined index values.

11. The method of claim 10, wherein decoding comprises decoding the encoded bitstream associated with the enhancement layer, wherein the encoded bitstream lacks information for the estimated type-0 refinement coefficient values, wherein generating the information comprises generating the estimated type-0 refinement coefficient values.

12. The method of claim 11, further comprising receiving a signal indicating that the information for the estimated refinement coefficient values is excluded from the bitstream as determined by evaluation of the history of transform coefficient values associated with one or more previous layers of the SVC scheme.

13. The method of claim 10, wherein decoding the refinement coefficients of the enhancement layer comprises decoding refinement coefficients of an $n^{th}$ layer of the SVC scheme, wherein evaluating the history comprises determining whether refinement coefficient values associated with an $(n-1)^{th}$ layer of the SVC scheme had non-zero values, and wherein generating information that estimates one or more of the type-0 refinement coefficient values associated with the enhancement layer comprises assigning values of zero to coefficients of the $n^{th}$ layer for which corresponding coefficients of the $(n-1)^{th}$ layer had non-zero values.

14. A method of encoding refinement coefficients of an enhancement layer in a scalable video coding (SVC) scheme, the method comprising:

evaluating a history of transform coefficient values associated with one or more previous layers of the SVC scheme;

assigning index values for refinement coefficients of the enhancement layer, the index values being dependent upon corresponding transform coefficient values associated with the one or more previous layers of the SVC scheme, wherein a given index value (h) is calculated as follows:

h=0
for (i=0; i<n; i++){
  sig=($c_i$=0)?1: 0;
  h=h+sig*(2<<i);
}
where i is a layer number, $c_i$ is a value of a collocated coefficient at layer i, i++ refers to i=i+1, and sig is an intermediate variable, defining a first subset of the refinement coefficients of the enhancement layer as type-0 refinement coefficients based on the assigned index values dependent upon corresponding transform coefficient values associated with the one or more previous layers of the SVC scheme, wherein the type-0 refinement coefficients are those that define a high probability of being zero based on the assigned index values dependent upon history of corresponding transform coefficient values associated with the one or more previous layers of the SVC scheme;

defining a second subset of the refinement coefficients of the enhancement layer as type-1 refinement coefficients based on the assigned index values dependent upon corresponding transform coefficient values associated with the one or more previous layers of the SVC scheme, wherein the type-1 refinement coefficients are those that do not qualify as type-0 coefficients and wherein the type-1 refinement coefficients are those that do not define a high probability of being zero based on the history of corresponding transform coefficient values associated with the one or more previous layers of the SVC scheme;

coding the type-1 refinement coefficients into an encoded bitstream, wherein the type-0 refinement coefficients are not coded into the encoded bitstream.

15. The method of claim 14, further comprising signaling to a decoder that the type-0 refinement coefficients are not coded into the encoded bitstream.

16. A device that decodes refinement coefficients of an enhancement layer in a scalable video coding (SVC) scheme, the device comprising one or more processors and a memory configured to define:

a history module that evaluates a history of transform coefficient values associated with one or more previous layers of the SVC scheme by assigning index values for refinement coefficients of the enhancement layer, the index values being dependent upon corresponding transform coefficient values associated with the one or more previous layers of the SVC scheme, wherein a given index value (h) is calculated as follows:

$h=0$
for (i=0; i<n; i++){
  sig=($c_i$=0)? 1: 0;
  h=h+sig*(2<<i);
} where i is a layer number, $c_i$ is a value of a collocated coefficient at layer i, i++ refers to i=i+1, and sig is an intermediate variable, wherein the history module defines a first subset of the refinement coefficients of the enhancement layer as type-0 refinement coefficients, based on the assigned index values dependent upon the transform coefficient values associated with the one or more previous layers of the SVC scheme, and defines a second subset of the refinement coefficients of the enhancement layer as type-1 refinement coefficients, based on the assigned index values dependent upon the transform coefficient values associated with the one or more previous layers of the SVC scheme, wherein the type-0 refinement coefficients are those that define a high probability of being zero based on the history of corresponding transform coefficient values associated with the one or more previous layers of the SVC scheme, wherein the type-1 refinement coefficients are those that do not qualify as type-0 coefficients, and wherein the type-1 refinement coefficients are those that do not define a high probability of being zero based on the history of corresponding transform coefficient values associated with the one or more previous layers of the SVC scheme; and a decoding module that decodes information for the type-1 refinement coefficients from an encoded bitstream, and generates information that estimates one or more of the type-0 refinement coefficient values associated with the enhancement layer based on the assigned index values dependent upon corresponding transform coefficient values associated with one or more previous layers of the SVC scheme, wherein the type-0 refinement coefficients are not coded into the encoded bitstream, wherein the decoding module generates the information by assigning values of zero to refinement coefficients of the enhancement layer that have index values that correspond to one or more pre-defined index values.

17. The device of claim 16, wherein the decoding module decodes the encoded bitstream associated with the enhancement layer, wherein the encoded bitstream lacks information for the estimated type-0 refinement coefficient values, and wherein the decoding module generates the estimated type-0 refinement coefficient values.

18. The device of claim 17, wherein the decoding module receives a signal indicating that the information for the estimated refinement coefficient values is excluded from the bitstream as determined by evaluation of the history of transform coefficient values associated with one or more previous layers of the SVC scheme.

19. The device of claim 16, wherein the decoding module decodes refinement coefficients of an $n^{th}$ layer of the SVC scheme, wherein the history module determines whether refinement coefficient values associated with an $(n-1)^{th}$ layer of the SVC scheme had non-zero values, and wherein the decoding module assigns values of zero to coefficients of the $n^{th}$ layer for which corresponding coefficients of the $(n-1)^{th}$ layer had non-zero values.

20. The device of claim 16, wherein the device comprises a wireless communication device.

21. A device that encodes refinement coefficients of an enhancement layer in a scalable video coding (SVC) scheme, the device comprising one or more processors and a memory configured to define:

a history module that evaluates a history of transform coefficient values associated with one or more previous layers of the SVC scheme by assigning index values for refinement coefficients of the enhancement layer, the index values being dependent upon corresponding transform coefficient values associated with the one or more previous layers of the SVC scheme, wherein a given index value (h) is calculated as follows:

$h=0$
for (i=0; i<n; i++){
  sig≤($c_i$=0)? 1: 0;
  h=h+sig*(2<<i);
} where i is a layer number, $c_i$ is a value of a collocated coefficient at layer i, i++ refers to i=i+1, and sig is an intermediate variable; and wherein the history module defines a first subset of the refinement coefficients of the enhancement layer as type-0 refinement coefficients based on the assigned index values dependent upon corresponding transform coefficient values associated with the one or more previous layers of the SVC scheme, and defines a second subset of the refinement coefficients of the enhancement layer as type-1 refinement coefficients based on the assigned index values dependent upon corresponding transform coefficient values associated with the one or more previous layers of the SVC scheme, wherein the type-0 refinement coefficients are those that define a high probability of being zero based on the history of corresponding transform coefficient values associated with the one or more previous layers of the SVC scheme, wherein the type-1 refinement coefficients are those that do not qualify as type-0 coefficients, and wherein the type-1 refinement coefficients are those that do not define a high probability of being zero based on the history of corresponding transform coefficient values associated with the one or more previous layers of the SVC scheme; and encoding module that encodes the type-1 refinement coefficients in an encoded bitstream, wherein the type-0 refinement coefficients are not coded into the encoded bitstream.

22. The device of claim 21, wherein the encoding module generates a signal to indicate that the type-0 refinement coefficients are not coded into the encoded bitstream.

23. A non-transitory computer-readable medium comprising instructions that upon execution in a video decoding device cause the device to decode refinement coefficients of an enhancement layer in a scalable video coding (SVC) scheme, wherein the instructions cause the device to:

evaluate a history of transform coefficient values associated with one or more previous layers of the SVC scheme by assigning index values for refinement coefficients of the enhancement layer, the index values being dependent upon corresponding transform coefficient values associated with the one or more previous layers of the SVC scheme, wherein a given index value (h) is calculated as follows:

h=0
for (i=0; i<n; i++){
  sig=($c_i$=0)? 1: 0;
  h=h+sig*(2<<i);
} where i is a layer number, $c_i$ is a value of a collocated coefficient at layer i, i++ refers to i=i+1, and sig is an intermediate variable;

define a first subset of the refinement coefficients of the enhancement layer as type-0 refinement coefficients based on the assigned index values dependent upon the transform coefficient values associated with the one or more previous layers of the SVC scheme, wherein the type-0 refinement coefficients are those that define a high probability of being zero based on the history of corresponding transform coefficient values associated with the one or more previous layers of the SVC scheme;

define a second subset of the refinement coefficients of the enhancement layer as type-1 refinement coefficients based on the assigned index values dependent upon the transform coefficient values associated with the one or more previous layers of the SVC scheme, wherein the type-1 refinement coefficients are those that do not qualify as type-0 coefficients and wherein the type-1 refinement coefficients are those that do not define a high probability of being zero based on the history of corresponding transform coefficient values associated with the one or more previous layers of the SVC scheme;

decode information for the type-1 refinement coefficients from an encoded bitstream; and generate information that estimates one or more of the type-0 refinement coefficient values associated with the enhancement layer based on the assigned index values dependent upon corresponding transform coefficient values associated with one or more previous layers of the SVC scheme, wherein the type-0 refinement coefficients are not coded into the encoded bitstream, wherein generating the information comprises assigning values of zero to refinement coefficients of the enhancement layer that have index values that correspond to one or more pre-defined index values.

24. A device that decodes refinement coefficients of an enhancement layer in a scalable video coding (SVC) scheme, the device comprising:

means for evaluating a history of transform coefficient values associated with one or more previous layers of the SVC scheme, wherein the means for evaluating assigns index values for refinement coefficients of the enhancement layer, the index values being dependent upon corresponding transform coefficient values associated with the one or more previous layers of the SVC scheme, wherein a given index value (h) is calculated as follows:

h=0
for (i=0; i<n; i++){
  sig=($c_i$=0)? 1: 0;
  h=h+sig*(2<<i);
} where i is a layer number, $c_i$ is a value of a collocated coefficient at layer i, i++ refers to i=i+1, and sig is an intermediate variable; wherein the means for evaluating defines a first subset of the refinement coefficients of the enhancement layer as type-0 refinement coefficients, based on the assigned index values dependent upon the transform coefficient values associated with the one or more previous layers of the SVC scheme, and defines a second subset of the refinement coefficients of the enhancement layer as type-1 refinement coefficients, based on the assigned index values dependent upon the transform coefficient values associated with the one or more previous layers of the SVC scheme, wherein the type-0 refinement coefficients are those that define a high probability of being zero based on the history of corresponding transform coefficient values associated with the one or more previous layers of the SVC scheme, wherein the type-1 refinement coefficients are those that do not qualify as type-0 coefficients, and wherein the type-1 refinement coefficients are those that do not define a high probability of being zero based on the history of corresponding transform coefficient values associated with the one or more previous layers of the SVC scheme; and means for decoding that decodes information for the type-1 refinement coefficients from an encoded bitstream, and generates information that estimates one or more of the type-0 refinement coefficient values associated with the enhancement layer based on the assigned index values dependent upon corresponding transform coefficient values associated with one or more previous layers of the SVC scheme, wherein the type-0 refinement coefficients are not coded into the encoded bitstream, wherein generating the information comprises assigning values of zero to refinement coefficients of the enhancement layer that have index values that correspond to one or more pre-defined index values.

25. A circuit configured to decode refinement coefficients of an enhancement layer in a scalable video coding (SVC) scheme, wherein the circuit is configured to:

evaluate a history of transform coefficient values associated with one or more previous layers of the SVC scheme by assigning index values for refinement coefficients of the enhancement layer, the index values being dependent upon corresponding transform coefficient values associated with the one or more previous layers of the SVC scheme, wherein a given index value (h) is calculated as follows:

```
h=0
for (1=0; i<n; i++){
    sig=(c_i=0)? 1: 0;
    h=h+sig*(2<<i);
}
```
where i is a layer number, $c_i$ is a value of a collocated coefficient at layer i, i++ refers to i=i+1, and sig is an intermediate variable;

define a first subset of the refinement coefficients of the enhancement layer as type-0 refinement coefficients based on the assigned index values dependent upon the transform coefficient values associated with the one or more previous layers of the SVC scheme, wherein the type-0 refinement coefficients are those that define a high probability of being zero based on the history of corresponding transform coefficient values associated with the one or more previous layers of the SVC scheme;

define a second subset of the refinement coefficients of the enhancement layer as type-1 refinement coefficients based on the assigned index values dependent upon the transform coefficient values associated with the one or more previous layers of the SVC scheme, wherein the type-1 refinement coefficients are those that do not qualify as type-0 coefficients and wherein the type-1 refinement coefficients are those that do not define a high probability of being zero based on the history of corresponding transform coefficient values associated with the one or more previous layers of the SVC scheme;

decode information for the type-1 refinement coefficients from an encoded bitstream; and generate information that estimates one or more of the type-0 refinement coefficient values associated with the enhancement layer based on the assigned index values dependent upon corresponding transform coefficient values associated with one or more previous layers of the SVC scheme, wherein the type-0 refinement coefficients are not coded into the encoded bitstream, wherein generating the information comprises assigning values of zero to refinement coefficients of the enhancement layer that have index values that correspond to one or more pre-defined index values.

\* \* \* \* \*